United States Patent
Allen

(10) Patent No.: US 7,383,338 B2
(45) Date of Patent: *Jun. 3, 2008

(54) METHOD FOR CONNECTION ACCEPTANCE CONTROL AND RAPID DETERMINATION OF OPTIMAL MULTI-MEDIA CONTENT DELIVERY OVER NETWORKS

(75) Inventor: Arthur Allen, Mountain View, CA (US)

(73) Assignee: Burst.com, Inc., Santa Rosa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/445,568

(22) Filed: Jun. 2, 2006

(65) Prior Publication Data

US 2006/0218281 A1    Sep. 28, 2006

Related U.S. Application Data

(63) Continuation of application No. 11/031,416, filed on Jan. 7, 2005, which is a continuation of application No. 09/893,364, filed on Jun. 26, 2001, now Pat. No. 6,850,965, which is a continuation-in-part of application No. 09/344,688, filed on Jun. 25, 1999.

(60) Provisional application No. 60/108,777, filed on Nov. 17, 1998.

(51) Int. Cl.
*G06F 15/173* (2006.01)

(52) U.S. Cl. .................... 709/226; 709/223; 709/224; 370/232; 370/234

(58) Field of Classification Search ............. 709/219, 709/231, 220, 223–224, 226; 370/254, 468, 370/397, 232–235, 236
See application file for complete search history.

(56) References Cited

U.S. PATENT DOCUMENTS

| | | | |
|---|---|---|---|
| 5,502,816 A | 3/1996 | Gawlick et al. | |
| 5,504,744 A | 4/1996 | Adams et al. | |
| 5,583,995 A | 12/1996 | Gardner et al. | |
| 5,633,810 A | 5/1997 | Mandal et al. | |
| 5,838,663 A * | 11/1998 | Elwalid et al. | 370/233 |
| 5,838,921 A | 11/1998 | Speeter | |
| 5,978,357 A | 11/1999 | Charny | |
| 5,982,748 A * | 11/1999 | Yin et al. | 370/232 |
| 5,995,488 A | 11/1999 | Kalkunte et al. | |
| 6,047,328 A | 4/2000 | Charny et al. | |
| 6,052,384 A * | 4/2000 | Huang et al. | 370/468 |
| 6,069,894 A | 5/2000 | Holender et al. | |
| 6,125,396 A | 9/2000 | Lowe | |
| 6,192,029 B1 | 2/2001 | Averbuch et al. | |
| 6,212,169 B1 | 4/2001 | Bawa et al. | |
| 6,240,066 B1 | 5/2001 | Nagarajan et al. | |
| 6,240,103 B1 * | 5/2001 | Schoenblum et al. | 370/468 |
| 6,295,294 B1 * | 9/2001 | Odlyzko | 370/389 |
| 6,304,551 B1 | 10/2001 | Ramamurthy et al. | |
| 6,331,986 B1 * | 12/2001 | Mitra et al. | 370/468 |
| 6,400,686 B1 | 6/2002 | Ghanwani et al. | |
| 6,466,979 B1 | 10/2002 | Plouffe, Jr. | |
| 6,477,167 B1 | 11/2002 | Wu | |
| 6,493,317 B1 | 12/2002 | Ma | |
| 6,597,662 B1 | 7/2003 | Kumar et al. | |
| 6,647,419 B1 | 11/2003 | Mogul | |
| 6,721,789 B1 | 4/2004 | DeMoney | |
| 6,850,965 B2 | 2/2005 | Allen | |
| 6,950,399 B1 | 9/2005 | Bushmitch et al. | |
| 7,027,403 B2 | 4/2006 | Porikli et al. | |
| 7,191,246 B2 | 3/2007 | Deshpande | |
| 2003/0016664 A1 | 1/2003 | MeLampy et al. | |
| 2003/0072327 A1 | 4/2003 | Fodor et al. | |
| 2004/0090974 A1 * | 5/2004 | Balakrishnan et al. | 370/412 |
| 2004/0136379 A1 * | 7/2004 | Liao et al. | 370/395.21 |
| 2006/0165010 A1 * | 7/2006 | Christiance et al. | 370/252 |
| 2006/0176806 A1 * | 8/2006 | Yoshihara et al. | 370/229 |
| 2006/0224768 A1 * | 10/2006 | Allen | 709/234 |

OTHER PUBLICATIONS

Kim, S. et al., "Call Admission Control for Prioritized Adaptive Multimedia Services in Wireless/Mobil Networks", VTC 2000-Spring. 2000 IEEE 51st . Vehicular Technology Conference Proceedings, Tokyo, Japan, May 15-18, 2000, IEEE Vehicular Technology Conference, New York, NY, (May 15, 2000) IEEE, US, vol. 2 of 3: Conf. 51, pp. 1536-1540.

Reininger, D., et al., "A Dynamic Quality of Service Framework for Video in Broadband Networks", IEEE Network, IEEE Inc., New York, US (Nov. 6, 1998), 12:6, pp. 22-34.

Beard, C. et al., "Connection Admission Control for Differentiating Priority Traffic on Public Networks", Military Communications Conference Proceedings, 1999, Milcom 1999. IEEE Atlantic City, NJ, USA Oct. 31-Nov. 3, 1999, Piscataway, NJ, USA, IEEE, US (Oct. 31, 1999), pp. 1401-1408.

* cited by examiner

*Primary Examiner*—Thu Ha Nguyen
(74) *Attorney, Agent, or Firm*—Carr & Ferrell LLP

(57) ABSTRACT

A system for allocating bandwidth between a server device and at least one client device. The system includes a call acceptance module operative to receive an incoming request for service; a flow regulator configured to deliver content at a modulated target flow rate, the content being delivered between the server device and a respective client device when a call is accepted by the call acceptance module; and a flow optimizer configured to modulate the target flow rate of the flow regulator in order to optimize an aggregate flow of content.

26 Claims, 15 Drawing Sheets

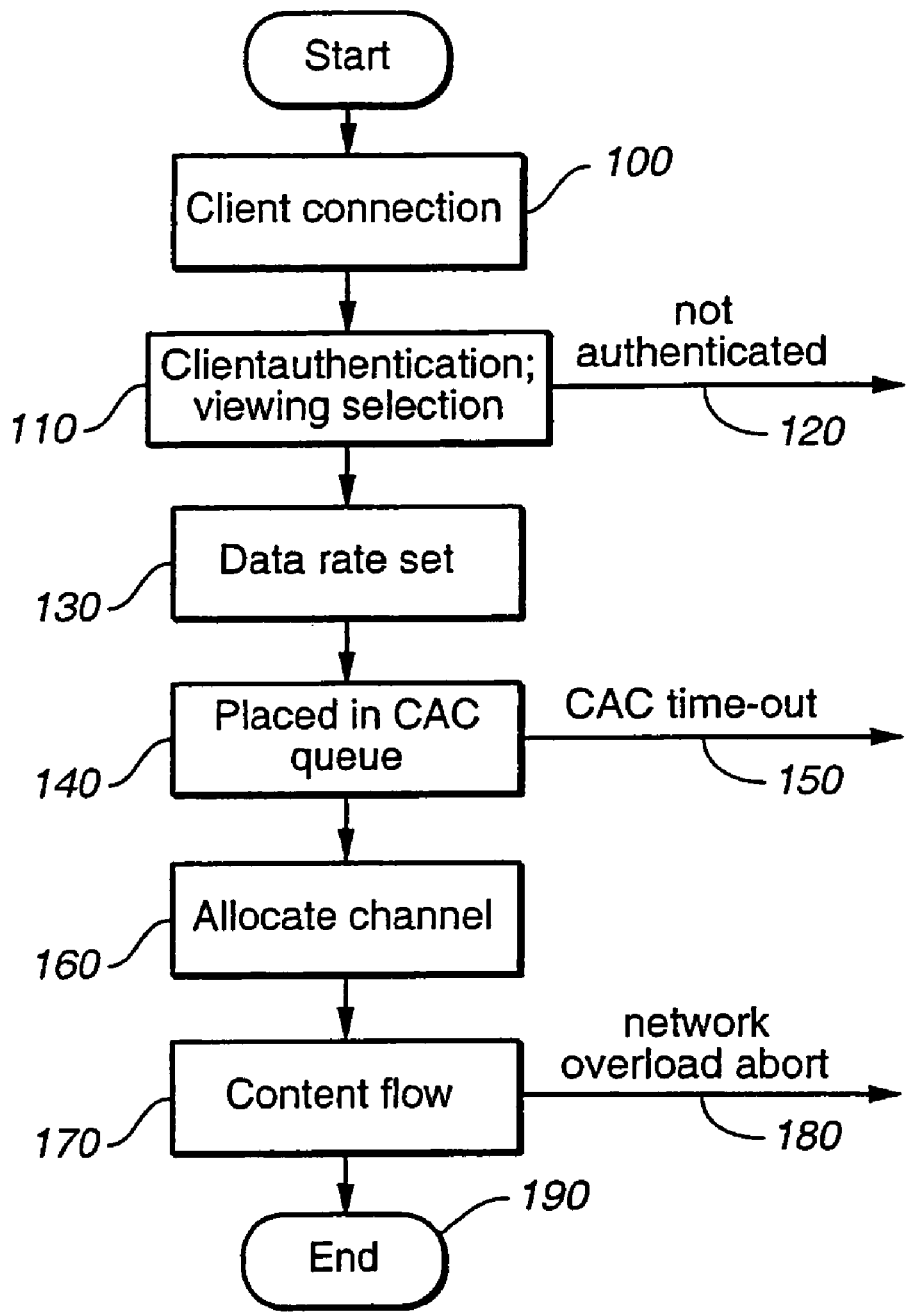
FIG._1

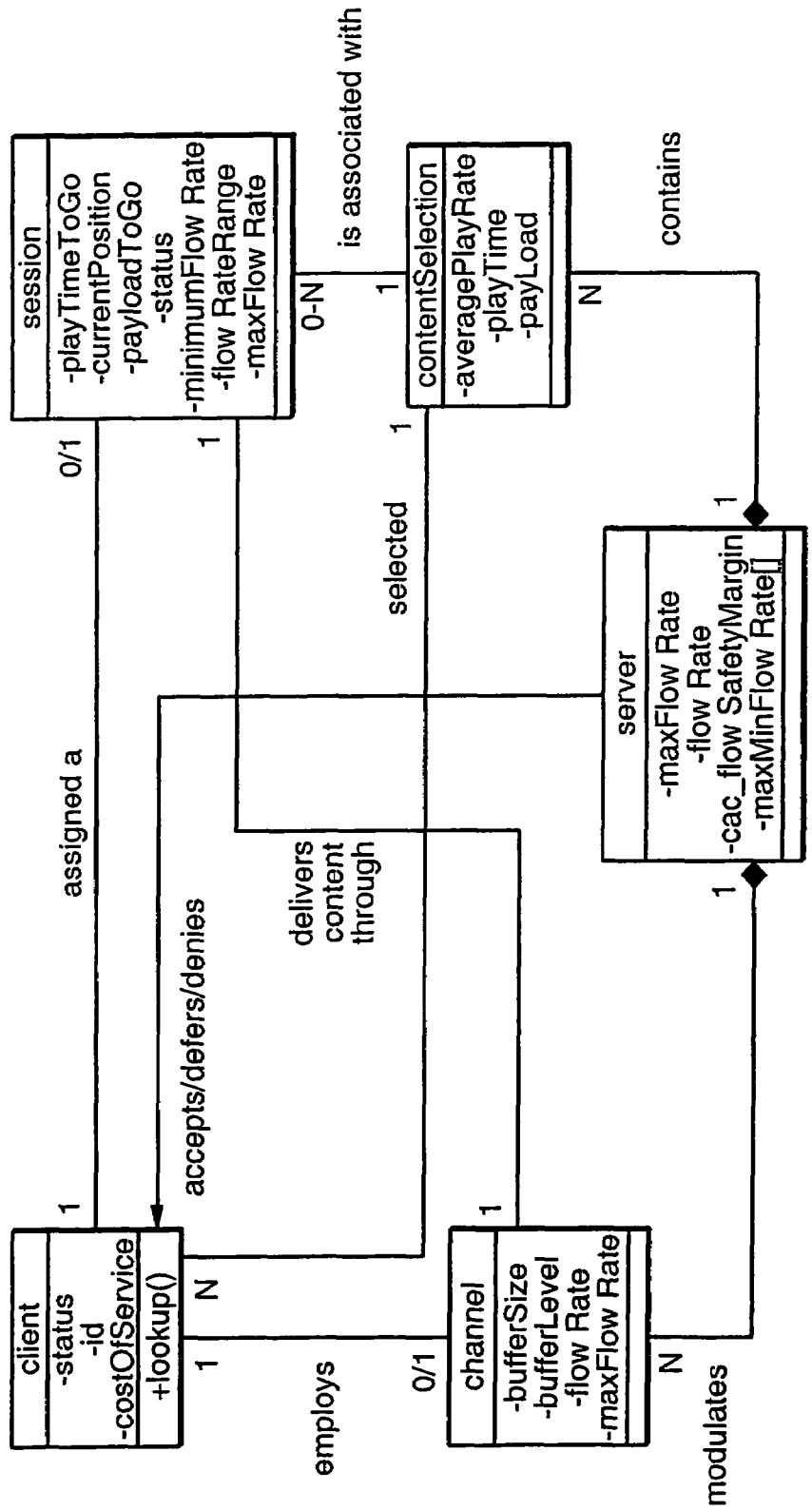
FIG._2

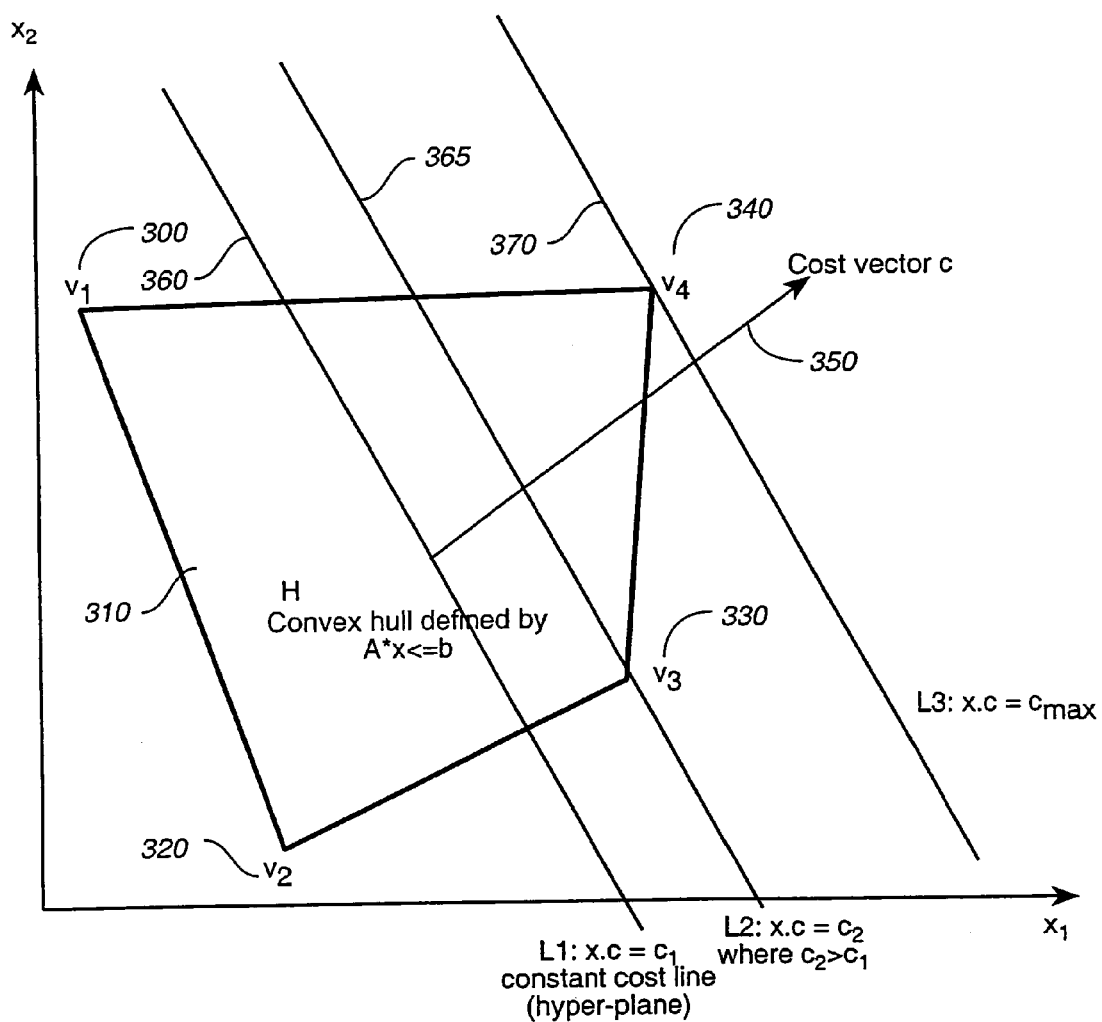
FIG._3

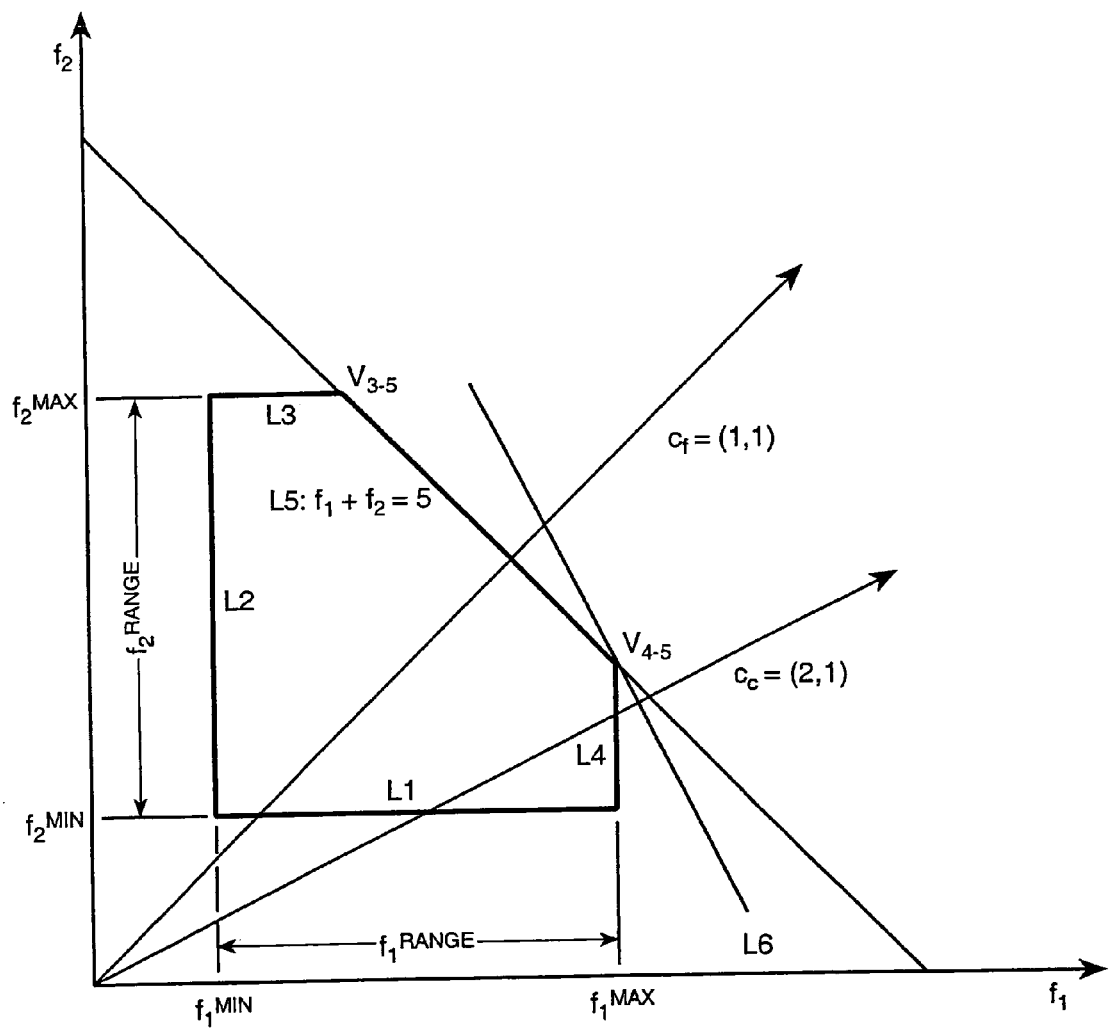
FIG._4a

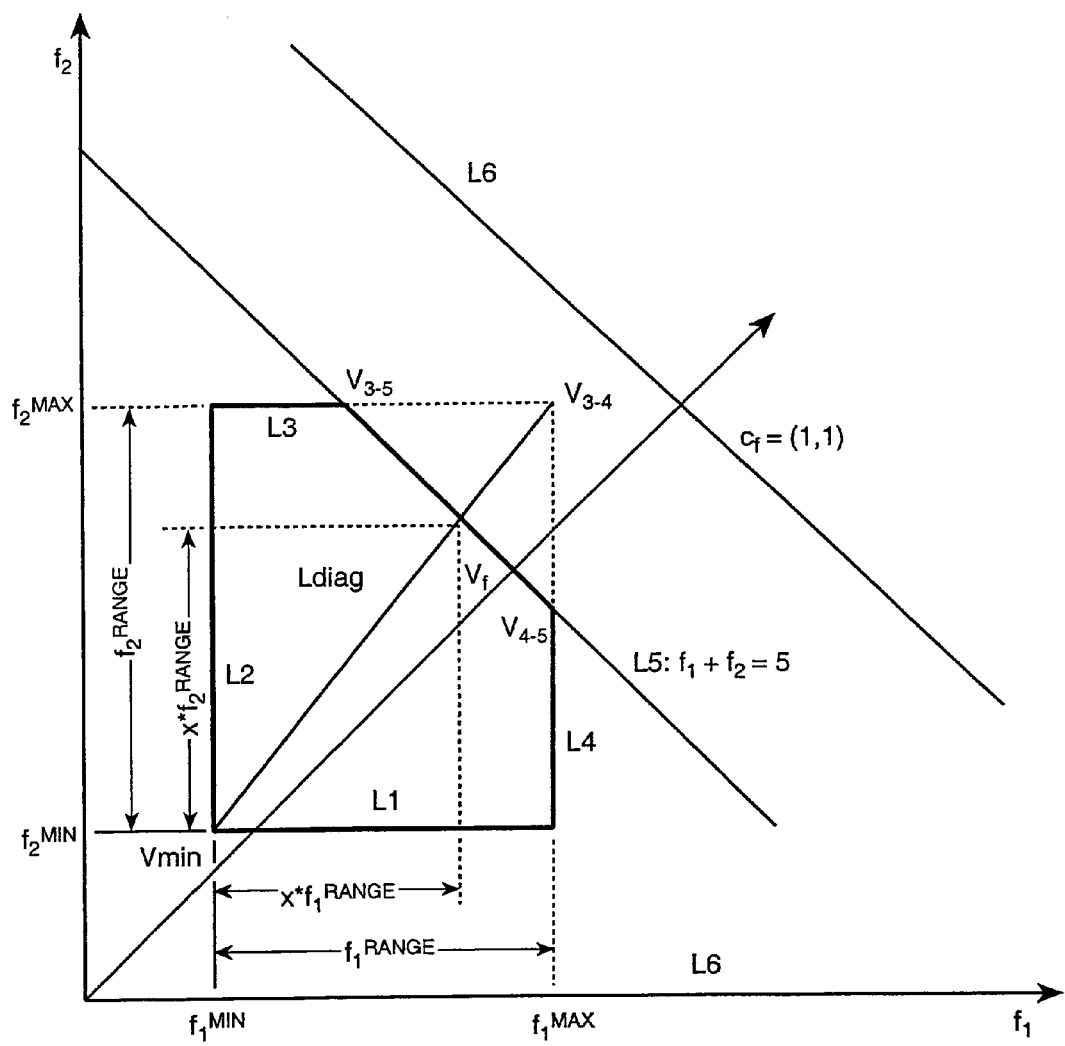
FIG._4b

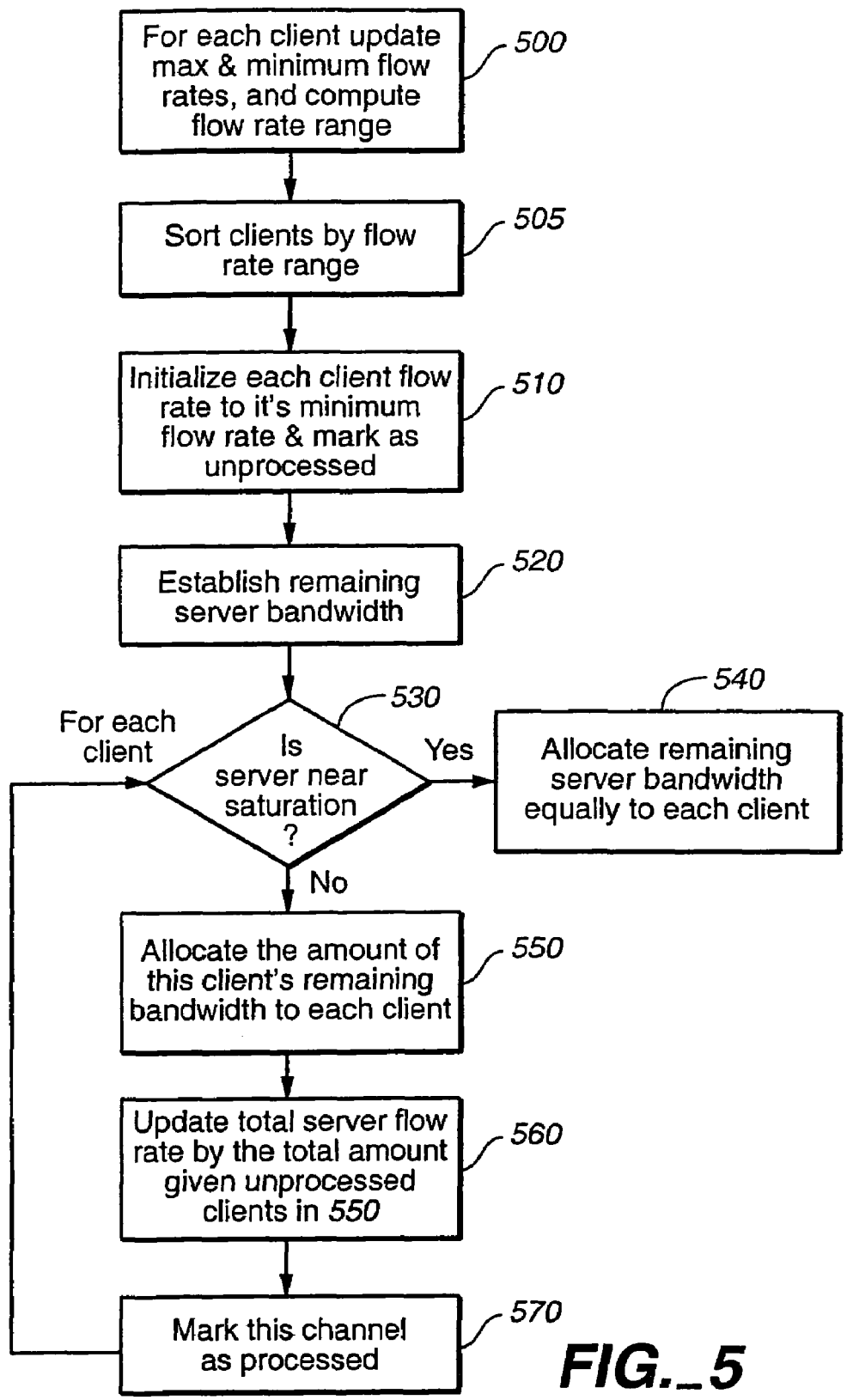
FIG._5

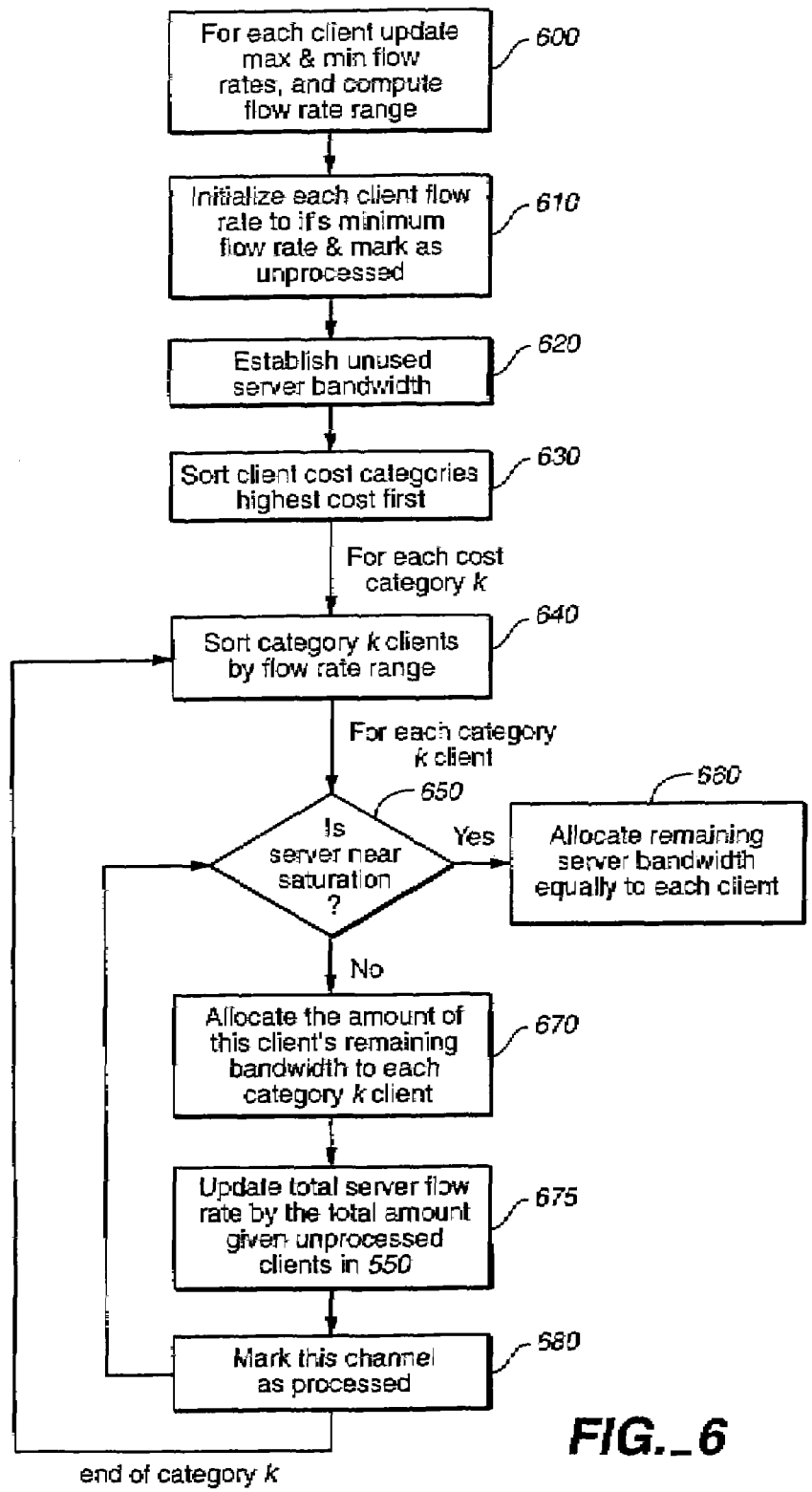
FIG._6

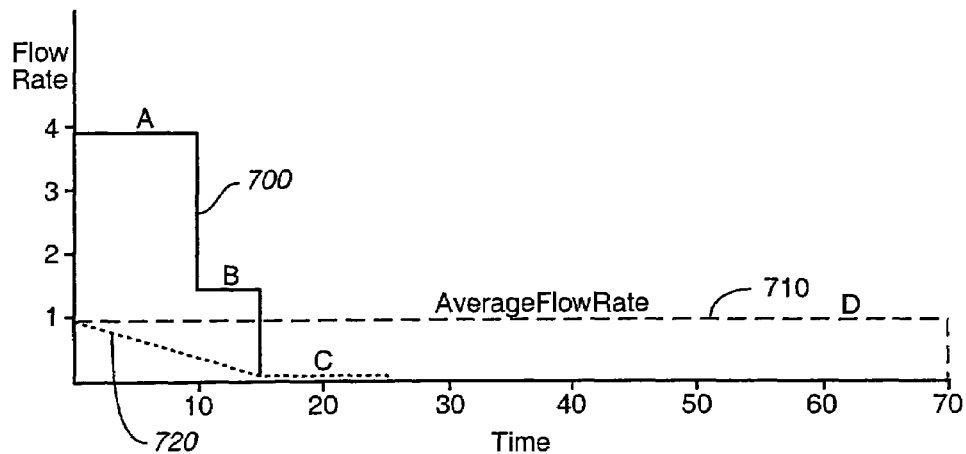
FIG._7
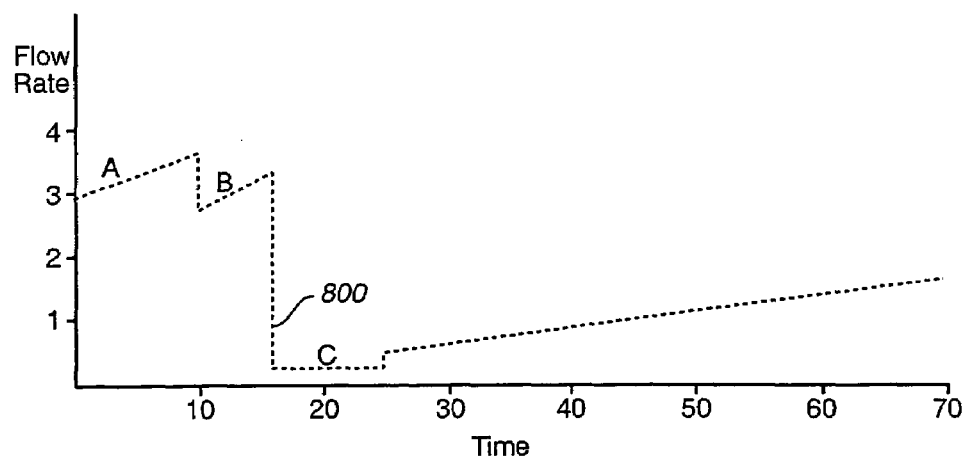
FIG._8

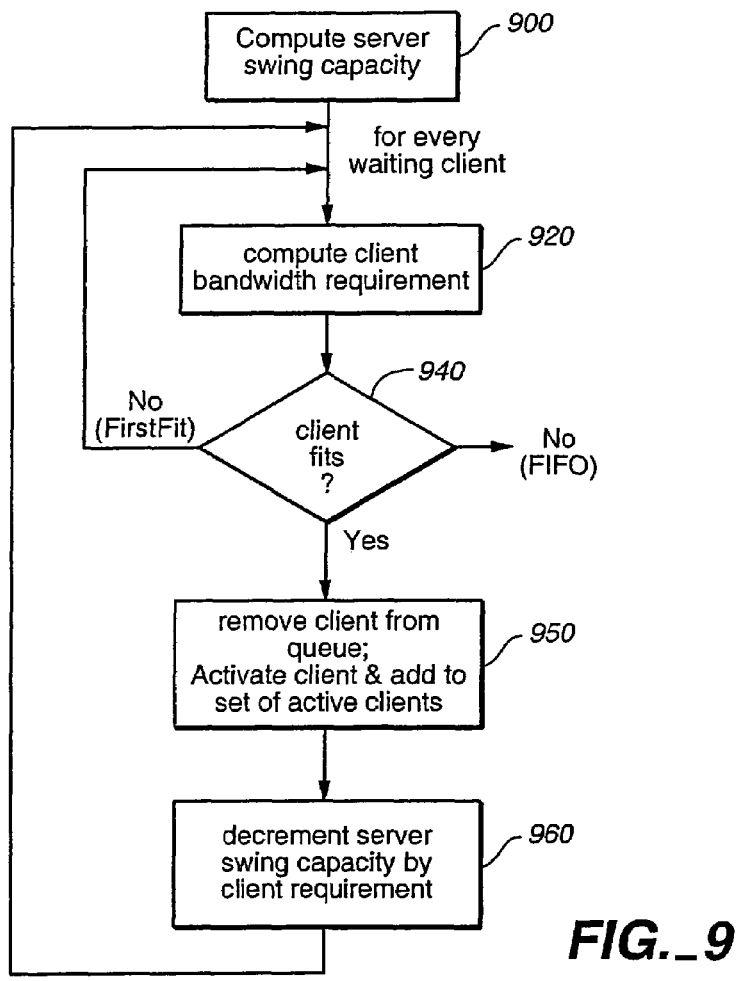
FIG._9
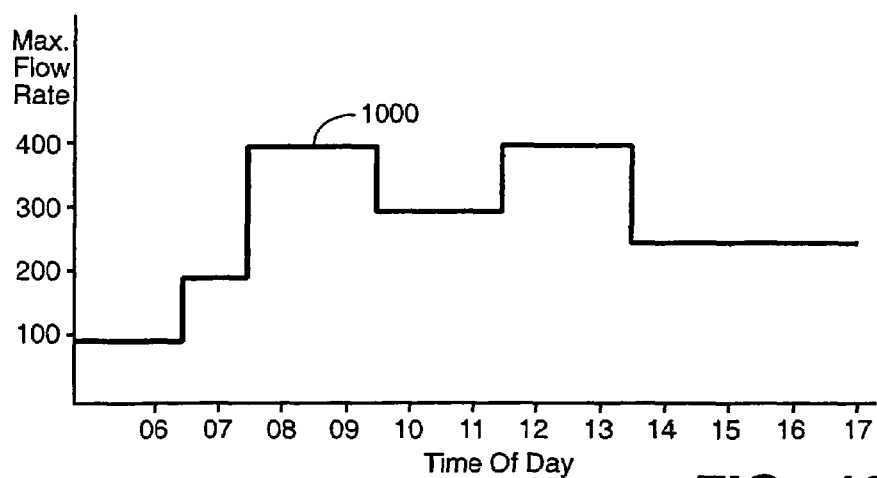
FIG._10

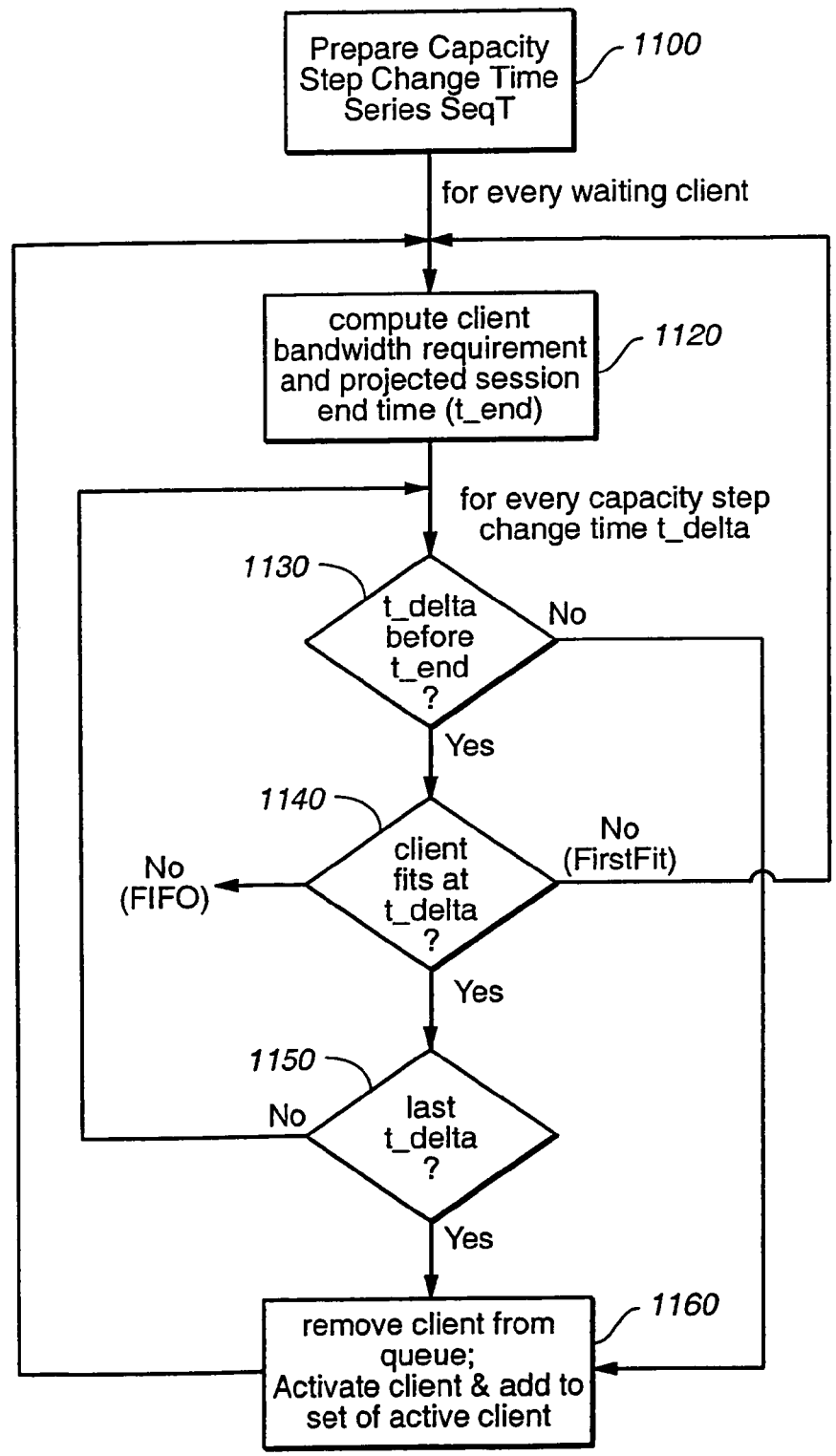
FIG._11

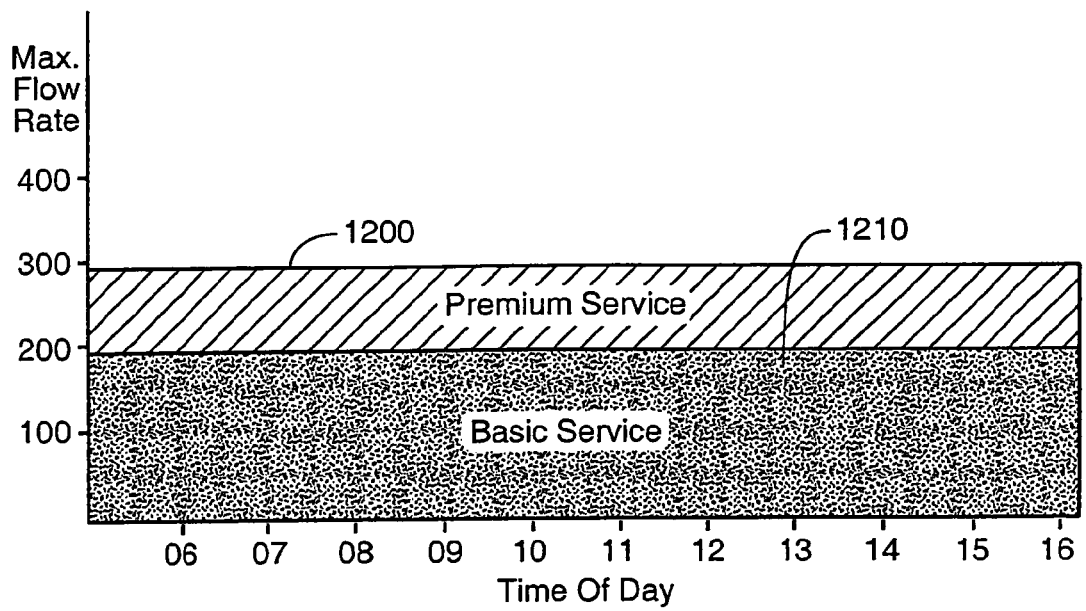
FIG._12
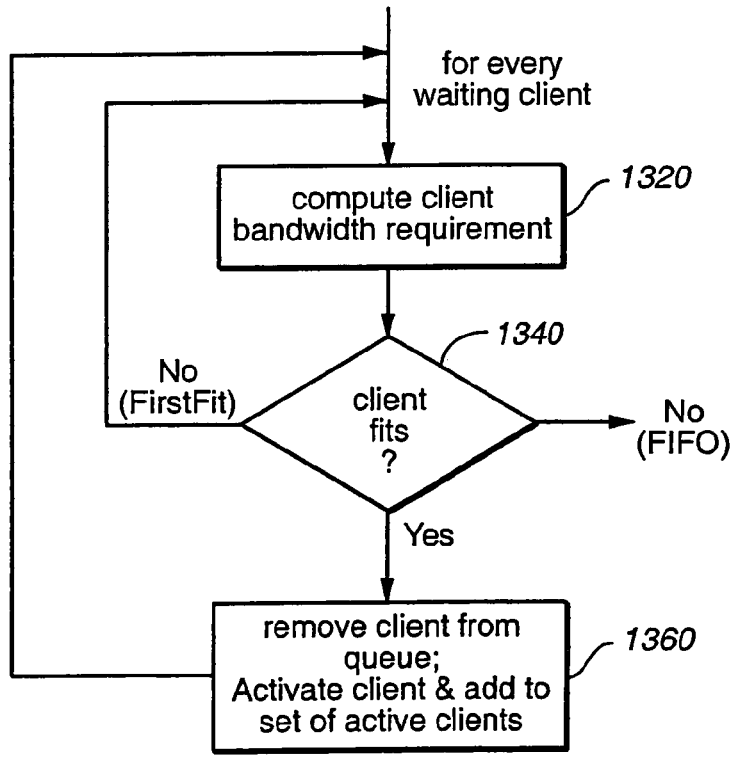
FIG._13

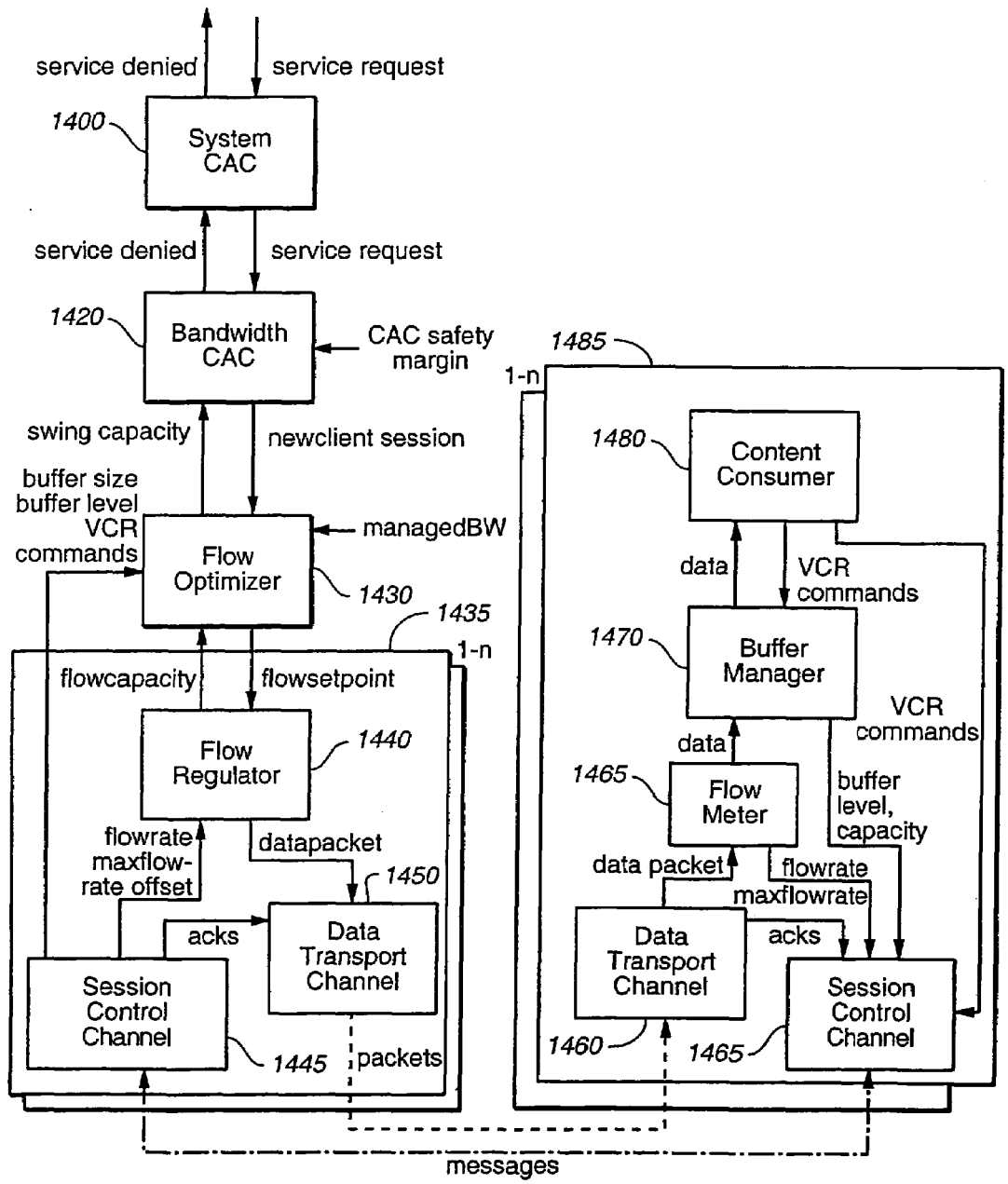
FIG._14

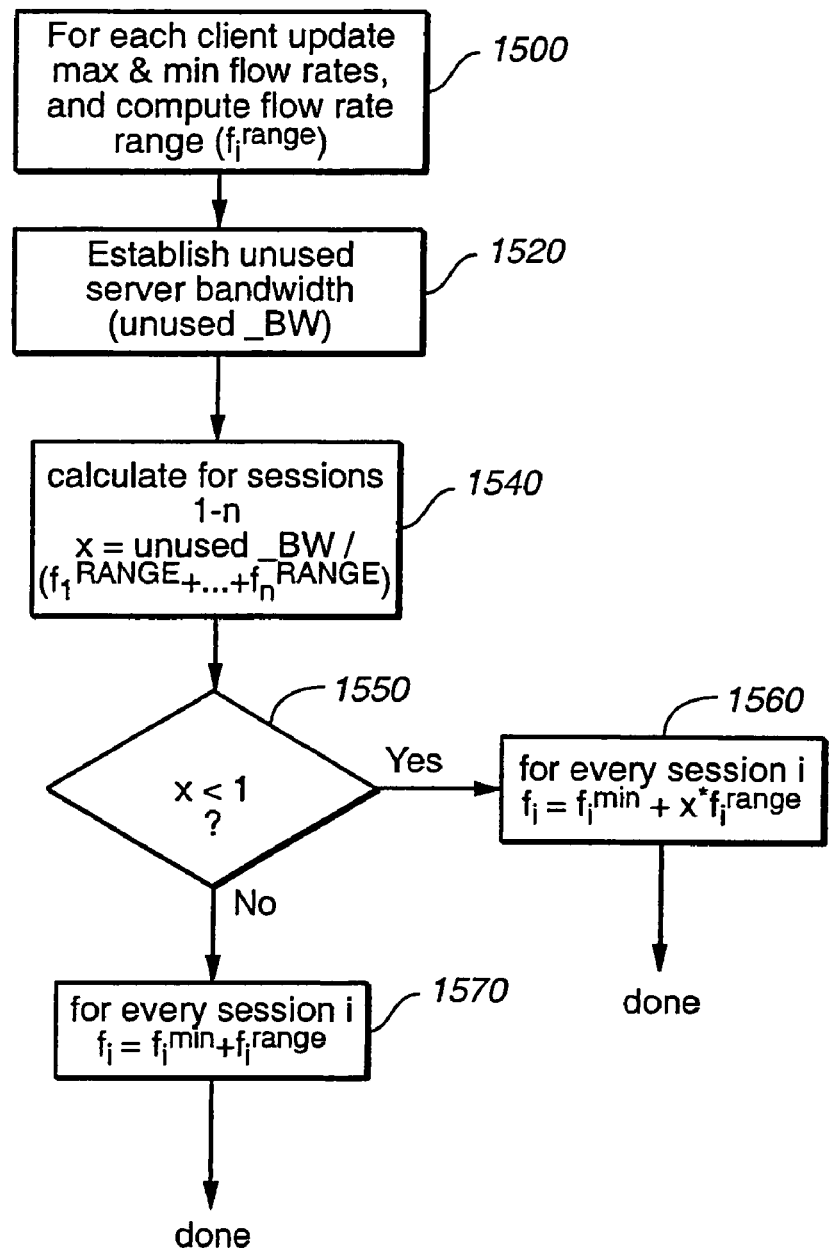
FIG._15

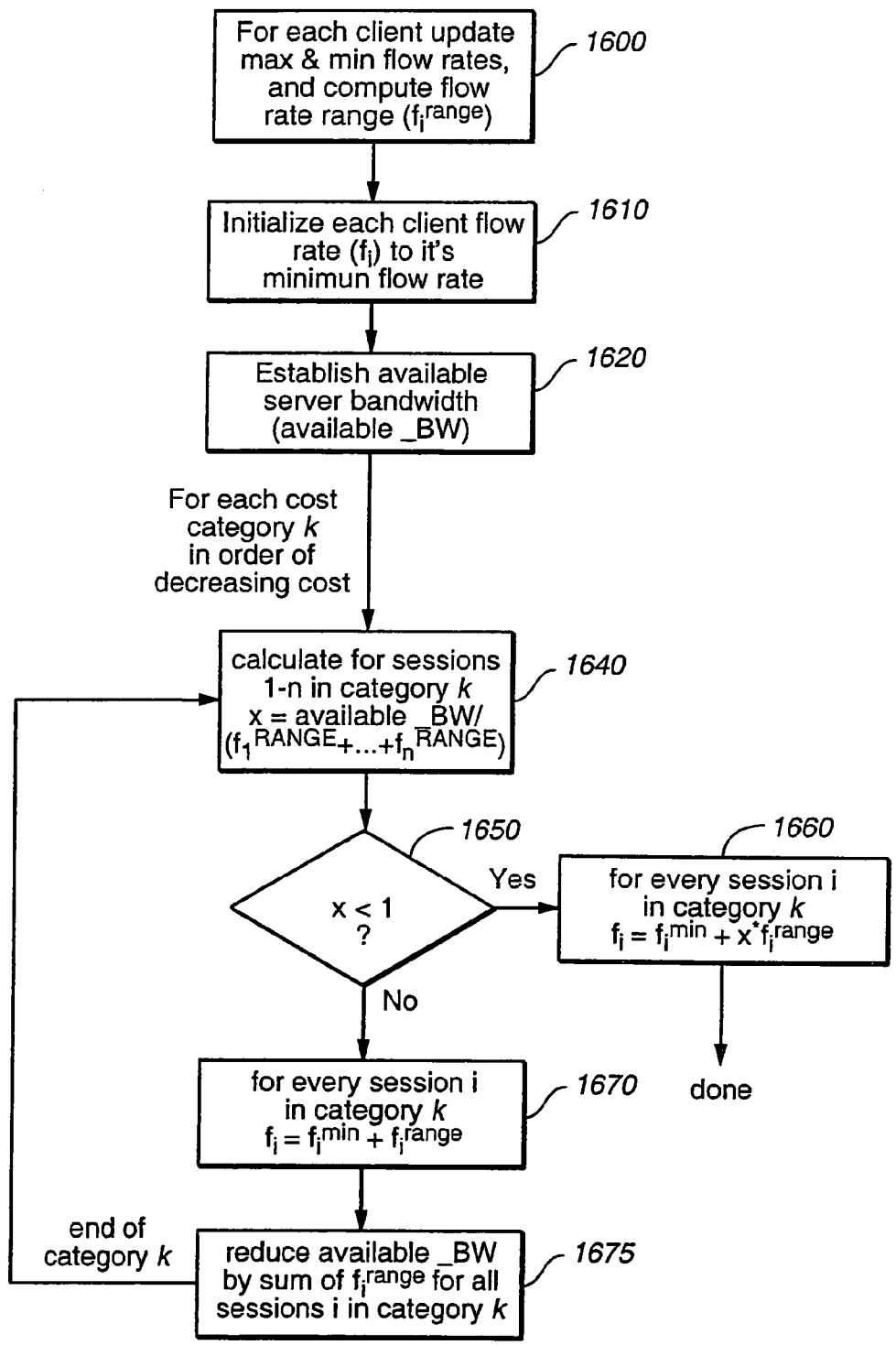
FIG._16

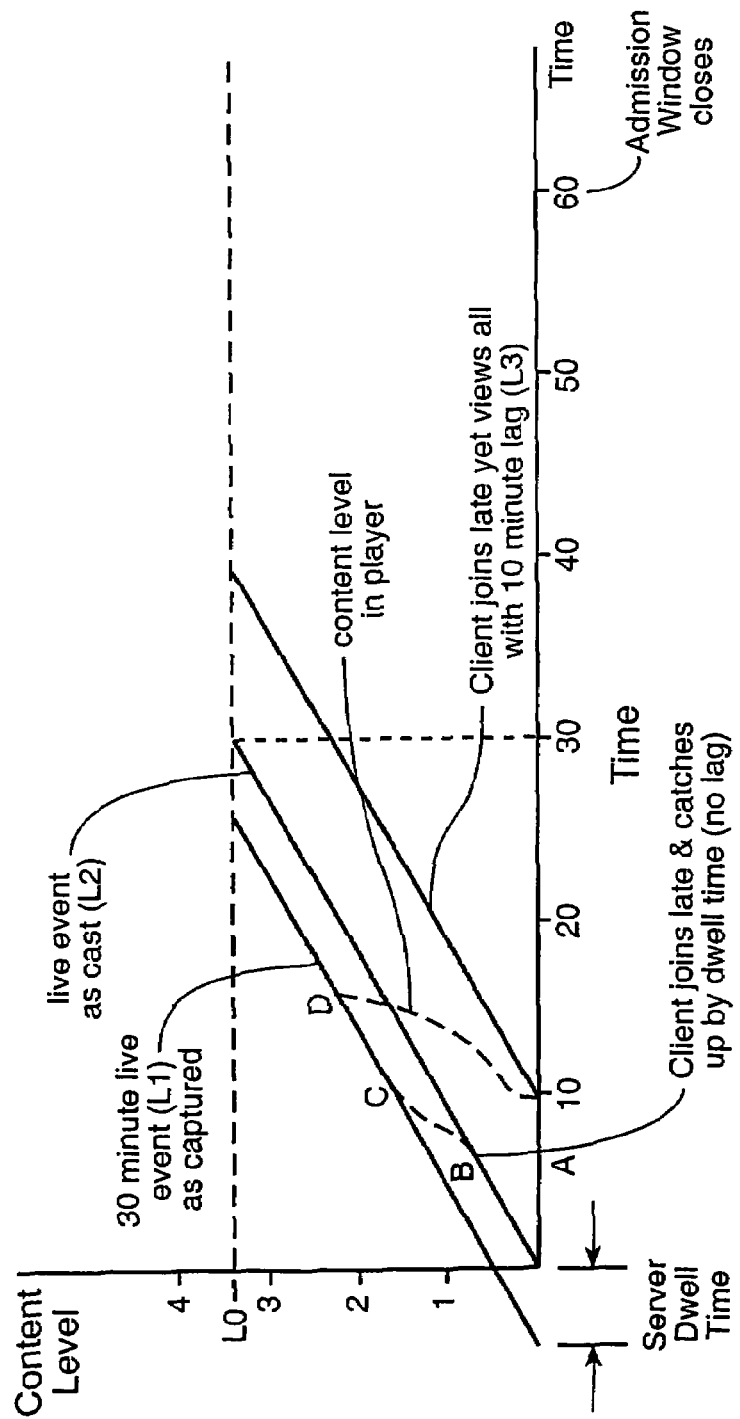
FIG._17

METHOD FOR CONNECTION ACCEPTANCE CONTROL AND RAPID DETERMINATION OF OPTIMAL MULTI-MEDIA CONTENT DELIVERY OVER NETWORKS

CROSS-REFERENCE TO RELATED APPLICATIONS

This application is a Continuation of U.S. patent application Ser. No. 11/031,416, filed Jan. 7, 2005, which is a Continuation of U.S. patent application Ser. No. 09/893,364, filed Jun. 26, 2001, (now U.S. Pat. No. 6,850,965) which is a Continuation-in-Part of U.S. patent application Ser. No. 09/344,688, filed Jun. 25, 1999, which claims priority U.S. Provisional Patent Application No. 60/108,777, filed Nov. 17, 1998, all of which are incorporated herein by this reference.

BACKGROUND OF THE INVENTION

1. Field of the Invention

This invention relates to the field of delivery of multimedia content over a variety of networks. More specifically, it pertains to multimedia servers which service many clients simultaneously for the delivery of multimedia content which is used and played back at each client. It addresses methods for determining optimal delivery rates to each client and methods for determining whether new clients may be accepted without diminishing the quality of service to existing clients.

2. Status of the Prior Art

In the history of multimedia program delivery, some in the industry have long advocated the use of large client-side buffers and faster-than-real-time content delivery over a network as offering the best of all worlds: a jitter-free viewing experience and a cost-effective utilization of the network resources at hand. Few systems, however, go very far in addressing how to schedule clients or a method for accepting new clients. Real-time systems, often known as streaming systems, can schedule new clients in a very simple manner—if sufficient bandwidth remains for the added real-time stream, then the client may be accepted. However, such systems do not maximize the number of simultaneous clients. On the other hand, faster than real-time delivery, sometimes known as store-and-forward systems, opens up the possibility for more flexible scheduling procedures to control and optimize the number of simultaneous clients while ensuring a high level of quality of service.

The methods for such call acceptance and flow modulation that have been proposed in the prior art have been largely ad-hoc and also incomplete. These have been ad-hoc in the sense that there has been no guiding rationale for their selection from among many possible and potentially superior alternatives. The methods have also been incomplete insofar as they did not address the question of whether any given incoming request for service should be accepted or denied. Video-on-demand systems, or more generally, any system in which a multimedia server is designed to serve multiple clients over a network to deliver bounded content, can benefit from the use of such flow modulation techniques and call acceptance procedures.

Optimal Content Flow Modulation

One time-honored way of designing methods of the class required here is to re-cast the problem to be solved as an optimization problem, in which one seeks to maximize a designated value function moment-by-moment, subject to a set of real-world operational constraints which will typically vary over time. Accordingly, given a set of clients and associated sessions, an optimal delivery procedure continuously establishes content flow rates from the content server to each of its clients so as to maximize aggregate value according to the governing value function.

This approach holds several advantages: 1) optimization problems are well understood, and are tractable by a large and diverse collection of computational methods; 2) if it exists, a global solution that is obtained is arguably optimal by construction, and thus superior or equal to all other.

The present invention teaches the method of optimizing two particular value functions: 1) total data delivered (maximize throughput). 2) total delivery charges (maximize charges).

The first value function does not distinguish one customer from another and will deliver as much data as possible from server to clients irrespective of the characteristics of the latter. The second value function favors the service of high paying customers. It can easily be seen that the first function is a special case of the second one whereby all clients are charged equally.

As will be seen in this disclosure, optimizing for these functions and identifying the necessary constraints requires a new and unique perspective that is specifically designed for the multimedia environment. Moreover, the disclosed methods are specifically designed to account for and accommodate real-world scenarios of today's networks. Consequently many variations of the method are presented to accommodate various scenarios.

SUMMARY OF THE INVENTION

Call/Connection Acceptance Control (CAC)

A CAC procedure is responsible for deciding whether a candidate for service can be accommodated without jeopardizing sessions already in progress at the present time or at some time in the future; failing that it must decide whether a service request should be queued for a time or rejected.

Flow Modulation

Flow modulation methods are those portions of the system which manage the communication and data flow between the server and the clients. Collectively, these methods provide the multimedia data to the client and provide the server with the information about the state of the transmission, playback, user status and network status. These parameters are further used by the present invention in the CAC procedures. In fact, as will be shown, the proposed CAC procedures are tightly integrated with the flow modulation methods.

Adaptation to Variations in Network Capacity

Operational constraints may change over time. For instance, one might elect to vary the total bandwidth available for multimedia content delivery according to the time of day. Alternatively, exogenous data flows on the network may cause unexpected disturbances by usurping available bandwidth and impeding the delivery of data along established session channels. The content delivery strategy of the present invention includes the ability to adapt to scheduled as well as unexpected disturbances so as to minimize unwanted disruptions of services.

Burst Transmissions Provide the Opportunity to Adapt

The present invention, due to it's faster-than-realtime transmissions (also know as burst transmissions), which are realized by use of high-bandwidth networks and large client cache or intermediate storage, provides an opportunity to adapt to changing network conditions. In contrast real-time (streaming) systems are essentially designed for worst-case scenarios: each client must be assumed to constantly use the complete real-time playback bandwidth. Such a system is unable to adapt to any derivation from this scenario. For example, take the simple case where the total server bandwidth is 100% utilized by all clients playing back the streaming video. Should any network condition change, such as a temporary decrease in available bandwidth over the network, then one or more clients' playback is interrupted, and the system can not recover from such a condition until the bandwidth is regained. Even worse if a single client presses pause either that unused bandwidth must remain reserved and no more clients can be accepted, or that paused client is pushed out in order to service the new client. In essence little or no CAC procedure may be implemented.

In contrast the present invention burst transmits portions of a program and immediately 'gets ahead of itself', thus allowing headroom for a myriad of methods to intelligently handle new clients, client interactivity and possible network fluctuations.

Methods are taught for optimally determining the flow rate to each client. Methods are also taught for accepting or rejecting new clients; these call-acceptance methods are tightly coupled with said flow rate modulation methods. A series of constraint expressions are presented which govern the methods for determining the flow rates and acceptance of new clients. Linear programming techniques are used to optimally solve these expressions. Various embodiments are presented including scenarios for multiple-rate tariffs, and time-of-day bandwidth variations.

BRIEF DESCRIPTION OF THE DRAWINGS

These as well as other features of the present invention will become more apparent upon reference to the drawings wherein:

FIG. 1 depicts the flow of control and/or data between the different stations of a content delivery session;

FIG. 2 illustrates the Entity Data Model;

FIG. 3 geometrically illustrates the linear programming problem statement;

FIG. 4a geometrically illustrates an expansion of the flow optimization problem statement;

FIG. 4b geometrically illustrates the method for rapid determination of flow rates to maximize flow;

FIG. 5 illustrates a method for implementing flow modulation to maximize flow;

FIG. 6 illustrates a method for implementing flow modulation for maximized charges;

FIG. 7 illustrates typical content flow;

FIG. 8 illustrates typical server swing capacity;

FIG. 9 illustrates a method for call-acceptance and control (CAC);

FIG. 10 illustrates planned constraints on maximum flow;

FIG. 11 illustrates a method for call-acceptance and control (CAC) with scheduled flow changes;

FIG. 12 illustrates stratification of services;

FIG. 13 illustrates a method for call-acceptance and control (CAC) for maximal charge;

FIG. 14 is a system block diagram for a system implementing the present optimization of client bandwidth;

FIG. 15 is a flowchart showing an algebraic method for calculating the optimization of client bandwidth;

FIG. 16 is a flowchart showing an algebraic method for calculating the optimization of client costs; and FIG. 17 illustrates optimized viewing of a live event.

DETAILED DESCRIPTION OF THE INVENTION

Data & Control Flows (FIG. 1)

FIG. 1 depicts the flow of control and/or data between the different stations of a content delivery session. As shown a client attempts a connection 100 and manifests itself to the Content Selection subsystem by means of a low bandwidth control channel (not shown). Next the client is authenticated and a selection is made 110, typically with the aid of browser software. If the client is not authenticated, it is dismissed from the system 120. If the client has been authenticated and a program selected for viewing then the rate of service is set at this point 130, perhaps according to the selection that was made, or some contractual stipulation. The client is now placed on the service queue of the CAC subsystem 140. A client that is made to wait too long will eventually balk 150. Assuming this does not occur, the CAC subsystem 140 will eventually allocate a channel to the client and open a session 160. Control now devolves upon the Content Flow Modulator (not shown) which starts the flow of content from server to client 170. Subsequent capacity changes, whether predictable or not, may force an abrupt termination of a session in progress 180. Otherwise the session runs to completion 190.

Entity Data Model (FIG. 2, Listing, Table)

The entities entering into our discussion are depicted in FIG. 2. Client 200 maintains certain data associated with this entity; as shown but not labeled, which includes without limitation, status, id and costOfService. The other entities also each include unlabeled but depicted data. The diagram further depicts the relationship between each entity. As shown, client 200 is assigned a session 240. Client 200 employs a channel 210. Client 200 selects contentSelection 230. Session 240 delivers content through channel 210. Server 220 modulates channel 210. Server 200 contains contentSelection 210. Server 220 accepts, defers or denies client 200 and contentSelection 230 is associated with session 240.

Furthermore FIG. 2 depicts the various one-to-many relationships. Each client 200 employs one channel 210. Client 200 may or may not receive one of channel 210, as depicted by the 0/1 notation. Similarly, client 200 may or may not receive a session 240. However, whenever client 200 does receive a session 240, it will always receive a channel 210 since channel 210 and session 240 are allocated as a pair. One or more (N) of client 200 may select one of contentSelection 230. And server 220 contains one or more (N) of contentSelection 230. Each one of contentSelection 230 is associated with 0-N of session 240. Each session 240 delivers content through one of channel 210. And server 220 modulates one or more (N) of channel 210.

A more detailed list of each entity of FIG. 2, and each one's associated description, data elements and function calls is listed below. This listing closely resembles that of object-oriented programming. As such, 'methods' represent the ability to obtain or modify data, while 'attributes' represent data which is directly associated with that particular entity. The listing also includes information relating to one embodiment wherein software programming specifics are disclosed, such as a variable type (double, int and so forth) and more. The present invention is not limited to such an embodiment and other implementations are possible without deviating from the scope and intent of the present invention. The listing, however detailed, is merely illustrative of the data and functions which are used in the equations and methods described herein.

Consequently, data and functions from this listing, associated with the various entities, will be used in forthcoming equations, flowcharts and methods. The reader is directed to this listing as reference when reading such equations and examining such drawings.

-Start of Entity Data Model Detailed Listing-

Model: Untitled 1 (Public)
Contains:
   client, session, channel, server, contentSelection.

Component: Client (Public Class/Interface)
Comment:
   A client entity stands for a client presently requesting or receiving service.
Methods:
   public static lookup (id: in int): client
   public GetId ( ): const int&
   public SetId (val: in int&)
   public GetCostOfService ( ): const double&
   public SetCostOfService (val: in double&)
Attributes:
   private status: client<int>
   Specifies whether or not a client has been allocated a channel and session.
   private id: int
   Integer-valued identifier that is unique to the client (primary key). Can be obtained from a monotonically increasing counter.
   private costOfService: double
   Dollar charge per Mbyte. This value is the same for all customers under flow optimization. Under cost/charge optimization may be an integer value reflective of the rank; the higher the rank the higher the charge.
Has:
   public selected: contentSelection
   public assigned a: session
   public employs: channel Component: Session (Public Class/Interface)
Comment:
   A session entity holds various state information about the service being received by an associated customer.
   public GetCurrentPosition ( ): const double&
   public SetCurrentPosition (val: in double&)
   public GetPayloadToGo ( ): const double&
   public SetPayloadToGo (val: in double&)
   public GetStatus ( ): const int&
   public SetStatus (val: in int&)
   public GetMinimumFlowRate ( ): const double&
   public SetMinimumFlowRate (val: in double&)
   public GetFlowRateRange ( ): const double&
   public SetFlowRateRange (val: in double&)
   public GetMaxFlowRate ( ): const double&
   public SetMaxFlowRate (val: in double&)
Attributes:
   private playTimeToGo: double
   Indicates the minutes remaining in the viewing experience. Initialized to contentSelectiont.playTime (see below).
   private currentPosition: double
   Pointer into media content from which content is being delivered.
   private payloadToGo: double
   The amount of media content (in Mbytes) as yet undelivered by the server. Does not include any content presently stored in the client-side buffer.
   private status: int
   Indicates whether session is active or paused.
   private minimumFlowRate: double
   This is the minimum flow from server to client required to ensure uninterrupted service over the remaining playTime. Has a value of zero if playloadToGo is zero. Given by (payloadToGo*8)/(playTimeToGo*60).
   private flowRateRange: double
   Specifies the effective range over which the channel content flow serving a session is constrained without consideration for interactions with other flows. Equals maxFlowRate−minimumFlowRate
   private maxFlowRate: double
   Effective maximum bound on flow as expressed in formula (8) which must be re-evaluated periodically.
Has:
   public delivers content through: channel Component: Channel (Public Class/Interface)
Comment:
   A channel represents the network resources from server to client associated with an ongoing session, encompassing the client-side buffer if any, and its level.
   public GetBufferLevel ( ): const double&
   public SetBufferLevel (val: in double&)
   public GetFlowRate ( ): const double&
   public SetFlowRate (val: in double&)
   public GetMaxFlowRate ( ): const double&
   public SetMaxFlowRate (val: in double&)
Attributes:
   private bufferSize: double
   Capacity of the client-side buffer (or equivalent).
   private bufferLevel: double
   Current buffer level in MBytes of stored content.
   private flowRate: double
   Flow rate through channel specified by the relevant optimizing flow modulator.
   private maxFlowRate: double
   This value represents the maximum possible flow rate from the server to an individual client over its "channel". This value reflects restrictions on flow that pertain to an individual client. It may be determined by factors such as the bandwidth of client's link to the network, or a limit imposed administratively to ensure balanced network utilization.

Component: Server (Public Class/Interface)
Comment:
   Entity representing the media server and its CAC and flow modulation activities.
   public GetFlowRate ( ): const double&
   public SetFlowRate (val: in double&)
   public GetMaxMinFlowRate[]( ): const double&
   public SetMaxMinFlowRate[](val: in double&)
Attributes:
   private maxFlowRate: double
   Maximum possible content flow that is allocated to the server by the network.
   private FlowRate: double
   Aggregate content flow rate, summed over all sessions and their associated channels.
   private cac.flowSafetyMargin: double Tunable safety margin used by the CAC algorithm to protect sessions-in-progress from being affected by changes in available network bandwidth.

private maxMinFlowRate[]: double

Applies when N rate tariffs exist. This array holds the maximum floor level for each category of service. The value for the costliest category N is stored in maxMinFlowRate[N−1], and for the least costliest in maxMinFlowRate[0]. It is the relative magnitude of these ascending values that matters, not their absolute value. Thus the actual maximum floor flow rate for category k is given by server.maxFlowRate*(server.maxMinFlowRatc[k−1]/server.maxMinFlowRate[N−1]). Similarly, the maximum floor flow rate for category N is server.maxFlowRate.

Has:
public contains: contentSelection
public modulates: channel

Component: contentSelection (Public Class/Interface)
Comment:

Entity represents a video/sound clip or other bounded unit of content. A continuous data feed does not qualify.

Attributes:
private averagePlayRate: double

The average rate at which media content is consumed by the client, as computed by dividing the (payload*8) by the (playTime*60)

private playTime: double

Duration of play of the media content in minutes.

private payLoad: double total size of the content in Mbytes.

Has:
public is associated with: session

-End of Entity Data Model Detailed Listing-

The following table summarizes the highlights of the previous detailed description of each entity in FIG. 2.

TABLE 1

| Entity | Description |
|---|---|
| client 200 | Each client is denoted by an associated unique integer $index_{Id}$. The set of active clients is denoted by $S_{activeClients}$. The set of deferred clients is denoted by $S_{QdClients}$. Incoming clients are expected to select the content they wish to view prior to being queued for dispatch by the CAC sub-system, which requires knowledge of the client's bandwidth requirements, duration of play, and cost of service, all of which may vary according to the selection. |
| server 220 | Servers sit astride a network and can deliver media content through the network to their clients up to a designated maximum flow rate. The server is responsible for accepting or rejecting clients, launching sessions and associated channels for the former, and modulates content flows over all channels in an optimal manner. |
| channel 210 | A channel represents the data path between the server and the client. The channel buffer is typically located near or within the client's viewing station. The flow of content through the channel is set by the flow modulator sub-system. |
| contentSelection | A server will typically act as a repository for media content, 230 which it can deliver to clients upon demand. For purposes of the invention, media content is characterized by |

TABLE 1-continued

| Entity | Description |
|---|---|
| | its payload and the play duration, which together imply the averagePlayRate = (payload * 8)/(playTime * 60). The averagePlayRate is the streaming rate imposed by realtime just-in-time streaming algorithms. |
| session 240 | Every session represents an instance of media content delivery to an associated client over a designated channel. The playTimeToGo indicates the time remaining before the content is fully played out to the client. The payloadToGo is the amount of content data as yet undelivered to the channel. A session terminates when this value reaches zero, at which time playTimeToGo may still be large, according to the capacity, the level of the channel buffer, and the media play rate. |

Constraints on Content Flow

Before referring to more Figures, it is imperative to establish some formulas and problem statements which are used in the methods which follow.

The flow of content between entities is subject to the following constraints at all times. Buffer levels are always expressed in Mbytes and data rates in Mbits/sec.

(1)  $\Sigma_{i \in SactiveClients}$(client.lookup(i).channel.flowRate) <=server.maxFlowRate The sum of all channel flows cannot exceed the imposed maximum throughput capacity of the server.

(2)  client.lookup(i).channel.flowRate<=client.lookup(i).channel.maxFlowRate for all $i \in S_{activeClients}$ The data path from server to client is subject to its own constriction.

(3)  client.lookup(i).channel.flowRate<=(client.lookup(i).channel.bufferSize−client.lookup(i).channel.bufferLevel)*8/60+client.lookup(i).session.mediaContent.averagePlayRate, for all $i \in S_{activeClients}$, The channel buffer is never allowed to overflow.

(4) client.lookup(i).channel.flowRate<=client.lookup(i).session.payloadToGo*8/60 for all $i \in S_{activeClients}$, Content that does not exist can not be delivered. (Constraint 1 will ordinarily prevail except at the very end of a session.)

The constraints listed above are straightforward applications relating to the flow of data through constricted channels, out of finite data sources, and into and out of bounded buffers. By contrast, the following constraint, which imposes a minimum channel flow rate instead of a maximum, is less obvious. The minimum value, termed the minFlowRate is set to the flow rate which, if sustained over the balance of the play time to go (playTimeToGo), ensures that all required content will be available when needed—and no sooner—until all content is played out. This floor value can be calculated for $i \in S_{activeClients}$ by the formula (5) client.lookup(i).session minFlowRate=(client.lookup(i).session.payloadToGo*8)/(client.lookup(i).session.playTimeToGo*60)

Accordingly, the flow rate on the right-hand-side is termed the just-in-time (JIT) flow rate ($f^{JIT}$).

Thus:

(6) client.lookup(i).channel.flowRate>=client.lookup(i).session.minFlowRate for all $i \in S_{activeClients}$ The variable constraint bounds (i.e. the values to the right of the inequality symbol) of equations 1-4 and 6 are re-evaluated on a periodic basis (e.g. once per second) prior to the execution of the CAC procedure and optimizer. In particular, the minFlowRate value starts out at the beginning of a session equal to the streaming rate. By construction the minFlowRate rate never exceeds this initial value so long as constraint 6 is honored. In fact, constraint 5 implies that the minflowRate value must be a diminishing function of time that may hold its value for a time but never rises. As seen from equation 6, the actual data rate of the channel, flowRate, is always greater than or equal to the minFlowRate. By design, and virtue of the fact the present invention uses faster-than-realtime transmissions, the system quickly gets ahead of itself and ensures that after initial conditions, the minFlowRate is always equal to or less than the real-time rate and that it continues to decrease. As we shall see, the CAC procedure exploits this monotonic characteristic of the minimum flow rate over time.

Constraints 2, 3 and 4 are of like kind, each specifying an upper bound on individual channel flows. Whereas the bound for constraint 2 is typically a constant, the bounds on 3 and 4 will vary over time. Nevertheless, only one of the three bounds is effective at any given time, namely the one with the smallest bound value, given by:

(7) client.lookup(i).session.maxFlowRate=minimum of
1) client.lookup(i).channel.maxFlowRate,
2) (client.lookup(i).channel.bufferSize−client.lookup(i).channel.bufferLevel)*8/60+client.lookup(i).session.mediaContent.averageplayRate,
3) client.lookup(i).session.payloadToGo*8/60

Consequently, formulas 2, 3, and 4 can be consolidated into a single constraint, the bound for which is computed at every scan to be the smallest bound of associated constraints 2, 3 and 4.

(8) client.lookup(i).channel.flowRate<=client.lookup(i).session.maxFlowRate, whereby for all $i \epsilon S_{activeClients}$, maxflowRate is given by equation (7).

At any one time, individual channel flows are constrained over a range, as follows:

(9) client.lookup(i).session.flowRateRange=client.lookup(i).session.maxFlowRate−client.lookup(i).session.minimumFlowRate Value Functions The value functions introduced in the Description of Related Art can now be expressed mathematically as linear functions of channel flows as follows:

Optimizing Throughput (Maximal Flow)
(10) value=$\Sigma_{i \epsilon SactiveClients}$ client.lookup(i).channel.flowRate)

Optimizing Charges (Maximal Charges)
(11) value=$\Sigma_{i \epsilon SactiveClients}$ (client.lookup(i).channel.flowRate)*client.lookup(i).costOfService)

Optimization Problem Statement (FIG. 3)

The optimization problem, which in one embodiment is strictly throughput and in another case is charge, can be stated simply as follows:
Find Values For
client.lookup(i).channel.flowRate for all $i \epsilon S_{activeClients}$
constrained by inequalities 1 through 5, such that the value obtained by evaluating expression 10 or 11 assumes a maximum.

Both of these problem formulations are examples of Linear Programming for which a number of well-known and generally effective computational solutions exist. In linear programming one seeks to optimize a linear cost function of variable x $$c*x=c_1*x_1+\ldots+c_n*x_n \quad (12)$$

subject to a set of linear inequality constraints $$A*x<=b \quad (13)$$

where $x^T=(x_1, x_n)$, $c=(c_1, \ldots, c_n)$ are the state variable & cost vectors, A is an n-by-m matrix, $b^T=(b_i, \ldots b_m)$ is the constraint vector, and the operator '*' stands for matrix or scalar multiplication.

FIG. 3 is introduced as illustrative of the problem statement and the general methods of the prior art, and is not incorporated as an element of the invention.

The linear programming problem as well as its solution can best be understood with the aid of geometry. FIG. 3, depicting a 2-dimensional Cartesian problem space, inequality constraints (13) define a convex hull H 310 over which a search for an optimum value of $x=(x_1,x_2)$ is permitted to range. The cost vector c350 defines an infinite family of equal cost lines (hyperplanes) which lie orthogonal to c. Three examples of such lines are shown in $L_1$360, $L_2$365, and $L_3$370, each of progressively higher value. The supreme value of the cost function is obtained by sliding along c 350 till one can go no farther, in this instance toward vertex $V_4$340 of hull H 310. Many well-known methods (e.g. the Simplex Method) work roughly in this fashion, exploiting the fact that at least one optimum point must be at a vertex. In particular, the Simplex method algorithm begins by finding a vertex (e.g. $V_2$320), and then moves along a sequence of vertices (e.g. $V_3$330, $V_4$340) improving itself each time until no further improvement is possible & the summit is reached.

Let us suppose instead that $V_3$330 were placed along $L_3$370 along with $V_4$340. According to prior art methods, $V_3$330 and $V_4$340 are the two possible solutions, but the equally valuable points in between them are not. As we shall soon see, the problem of throughput optimization (6) falls in this category.

While vertex $V_1$300 does not factor into this description, it is depicted in FIG. 3 for completeness.

Flow Modulation

Methods for Maximal Flow

The following sections detail two embodiments to optimize total data flow.

Overview (FIG. 4-a)

FIG. 4-a depicts a scenario involving two flows. The convex hull is in this instance bounded by line segments L1, L2, L3, L4 and L5. L6 is a boundary used in a different embodiment, however the present embodiment uses L5 and not L6. Flow $f_2$ can range over the interval separating line segments L1 from L3, namely $f_2^{MIN}$ and $f_2^{MAX}$; the range is depicted as $f_2^{RANGE}$. Flow $f_1$ can range over the interval between lines L2 and L4, namely $f_1^{MIN}$ and $f_1^{MAX}$, and depicted as $f_1^{RANGE}$. The sum of flows $f_1$ and $f_2$ is constrained to lie inside of line segment L5 which, by construction, is always orthogonal to the cost vector $C_f$. Cost vector $C_c$ is also illustrated but used in a distinct embodiment. In the present embodiment only $C_f$ is used. In the illustrated example of the present embodiment, the constraint on total flow is set to 5, and is therefore low enough to cause L5 to intersect L3 and L4. This would not have been true had the value chosen had been 10 instead of 5. With L5 safely out of contention, the convex hull would instead be a simple rectangle bounded by L1 through L4, thereby permitting both flows to assume their respective maxima without interference. In practice operational constraints exist intrinsically or are imposed from the outside so as to ensure cost effective sharing of potentially costly network resources.

Supposing FIG. 4 to be correct, the well-known methods would select vertex $V_{3-5}$, which lies at the intersection of L3 and L5, or $V_{4-5}$, which lies at the intersection of L4 and L5. These solutions, though optimal, are undesirable for the present invention as they fail to spread available bandwidth over all channels as fairly as would a centrally located interior point of L5. For this reason, two alternative optimization methods are taught, which are adapted to the particular needs of this problem and ensure a fairer allocation of constrained bandwidth among all channels.

Iterative Procedure (FIG. 5)

In order to optimize use of all available bandwidth, the following general method is used, with the details illustrated in FIG. 5. This method is a solution for the problem illustrated in FIG. 4-a, which geometrically illustrates the optimization problem in the limited case of two flows, f1 and f2. The following description expands the problem to an arbitrary number of clients (and therefore flows) and presents a method for solving this optimization problem.

Referring to FIG. 5, in step 500, values are calculated for the session maxFlowRate and session.minFlowRate for each client as per the minimum and maximum constraint bound expressions in equations 6 and 8, respectively. This step correlates to the determination of $f_1$min, $f_1$max, $f_2$min and $f_2$max from FIG. 4-a.

The difference between these two yields the session.flow-RateRange of each client. Thus:

session.flowRateRange=session maxFlowRate−session-.minimumFlowRate

In step 505, the active clients are sorted in an ascending fashion based upon their session.flowRateRange. As will be shown this critical step facilitates allocation of the remaining server bandwidth as evenly as possible among all active channels, thus maximizing the number of channels that benefit by use of the total server bandwidth. An arbitrary assignment of remaining bandwidth is likely to saturate the server before all channels have been assigned extra bandwidth, thereby favoring certain channels on an ad-hoc basis. This step correlates to keeping the solution in bounds of the space delinated by line segments L1-L5 of FIG. 4-a.

In step 510, each client's channel flow rate is set to the session mimimumFlowRate.

By doing so, it is ensured that the minimum flow constraint is met for each session and that the minimum flow rate is a non-increasing function of time, which is critical to the proper functioning of the CAC procedure. This portion of the process also ensures that the solution, starting from the vertex in FIG. 4-a as defined by the intersection of L1 and L2, moves generally in the direction of vector $c_f$. All clients are also marked as unprocessed.

In the next step, 520, server.flowRate is set to the sum of each active client's session.flowRate.

Next, the following is iterated over all clients in sorted sequence (during any given iteration the selected client is given by its id) by performing steps 530 through 570. In step 530 evaluating the following expressions test for possible server saturation:

delta=(server.maxFlowRate−server.flowRate)/(qty of unprocessed clients)

range=client.lookup(id).session.maxFlowRate−client-.lookup(id).session.flowRate

If range is greater then delta, this implies that the server can be saturated in this iteration by allocating delta to all unprocessed clients (step 540).

On the other hand, the 'no' path for step 530 implies that the server is not saturated and that the present client (given by id) will saturate first. Accordingly, in 550 the delta variable is set as follows:

delta=range

To again correlate this process back to the geometry of FIG. 4-a, server saturation is indicated when the solution which is being sought in the direction of vector $c_f$ goes beyond line segment L5.

Next, the flow rate is incremented for all unprocessed clients by delta, causing client id to saturate.

In step 560 the server flow rate is adjusted accordingly:

server.flowRate=server.flowRate+delta*(qty of unprocessed clients)

In step 570 the client given by id, now saturated, is marked as processed

Algebraic Procedure (FIGS. 4-b and 15) By Interpolation

Referring to FIG. 4-b, the iterative method described in the previous section begins its search for a maximum from vertex $V_{min}$ along the direction shown by line $C_1$. In contrast, the present method follows the diagonal line segment $L_{diag}$ of the rectangle bounded by lines L1 through L4, starting at vertex $V_{min}$ and ending at point $V_{3-4}$.

Provided it exists, the intersection between $L_{diag}$ and L5, indicated by $V_f$, is optimal on the same basis as any other point lying along the intersection of L5 with the rectangle bounded by L1 through L4, as previously discussed.

Whenever L5 does not intersect this rectangle, the optimal solution is given by vertex V3-4 at which f1 and f2 both assume their respective maxima.

In the first instance, the coordinates for point $V_f$ can be obtained by elementary vector geometry and algebraic manipulation, as follows:

First, we define a number of abbreviations, $f_k^{min}$ represents client.lookup(k).session.minimum flow rate $f_k^{range}$ represents client.lookup(k).session.flow rate range $f_{svf}^{max}$ represents server.maxflowrate We seek scale factor x such that the vector sum of ($f_1^{min}$ ... $f_n^{min}$)+x($f_1^{range}$ ... $f_n^{range}$) intersects an equi-cost hyperplace for capacity c.

The point of intersection is obtained by solving equation:

$$(f_1^{min}+ \ldots +f_n^{min})+x(f_1^{range}+ \ldots +f_n^{range})=c$$

Solving for x, we obtain:

$$x=[c-(f_1^{min}+ \ldots +f_n^{min})]/(f_1^{range}+ \ldots +f_n^{range})$$

where $f_{svr}^{max}-(f_1^{min}+ \ldots f_n^{min})$ represents the unused bandwidth beyond the minimum allocation for each session. For any given session, the optimal flow rate is given by $$f_i=f_i^{min}+x f_i^{range}, \text{ if } x<1,$$

or $$f_i=f_i^{min}+f_i^{range}, \text{ if } x>=1$$

This solution by interpolation is interesting by virtue of the great efficiency of the calculation, and the fact that no session saturates (x>=1) unless all sessions saturate. In contrast, the previous method entails considerably more computational effort, and tends to saturate sessions with the lowest reserve capacity.

A block diagram for this algorithm is depicted in FIG. 15. Block 1500 establishes the maxim and minima for each flow. For each flow the minimum is subtracted from the maximum to obtain the range. Available Bandwidth is calculated in block 1520, as the difference between the aggregate flow capacity and the sum of flow minima. Factor x is calculated next in block 1540, and tested against 1 in block 1650. Flow rates for each session are computed in block 1560 if x is less than 1, or 1570 in the contrary case.

A Method for Maximal Charge

The following sections detail one embodiment to optimize the total monetary charges within the system. The second method is algebraic in nature, and thus very efficient.

Overview (FIG. 4-*a*)

Referring back to FIG. 4-*a*, cost vector $C_c$ lies orthogonal to line L6, which intersects the convex hull at the vertex formed by the intersection of lines L4 and L5, namely $V_{4-5}$. This cost vector, and the optimal point that it implies, favors flow f1 over flow f2. In this example, as the cost of service for f1 equals 2, thus exceeding the cost of service of 1 set for f2. As the number of flows grow to exceed the number of distinct categories of service (and associated costs of service) the unique optimal solution, depicted in FIG. 4 for the case where every flow has a distinct cost of service, no longer applies. Once again a plurality of flows within a service category vie for bandwidth which a method should endeavor to distribute evenly. This method is derived from the previous one, and optimizes one cost category after another, starting with the most costly and ending with the least costly, or when all available capacity is allocated.

An Iterative Search Procedure (FIG. 6)

Let the service categories be denoted by k=1 . . . N, where k also denotes the cost of service.

Let $C_1 \ldots C_N$ be the partition of $S_{activeClients}$ that places all clients with cost of service k in set $C_k$. Partition sets $C_k$ can be ordered to form sequence SeqC=$C_N \ldots C_1$.

FIG. 6 depicts the method for implementing the method to maximize the cost of service (service charge).

This method is nearly identical to the iterative procedure used to maximize flow. The principle difference stems from the partitioning of clients according to their category (cost) of service: clients charged most are allocated bandwidth preferentially. This is accomplished by adding another level of iteration around the method of FIG. 5. The inner iteration (steps 650 through 680) functions exactly as before, with the difference that its actions are limited to the clients belonging to the given service category k (i.e. $C_k$). This difference also holds true of step 640 which sorts category k clients according to their flow ranges prior to entry in the bandwidth-allocating inner loop. The outer loop proceeds down a sorted sequence of service categories SeqC (generated in step 630), starting with the category generating the greatest revenue to the service provider. Given a fairly static set of service categories, this sort need be performed only when the categories undergo change. Steps 670, 675 and 680 are identical to their counterparts in the method of FIG. 5 (i.e. 570, 575 and 580).

The net effect of this method is preferential allocation of bandwidth according to category of service, and equitable treatment of clients within the same category of service.

An Iterative Algebraic Procedure (FIG. 16)

The algebraic method used to maximize bandwidth (FIGS. 4*b* and 15) can be viewed as a special case of cost optimization in which all costs are equal. By construction, all sessions belonging to a given category, starting with the most expensive category, and ending with the least, and updating available bandwidth after each step in sequence, we obtain an iterative algebraic method that scales much better than the preceding method.

A block diagram for this algorithm is depicted in FIG. 16. Block 1600 establishes the maxima and minima for each flow. For each flow, the minimum is subtracted from the maximum to obtain the range. In block 1610, every session flow is assigned the minimum allowed value, which value will apply by default should the iterative procedure run out of bandwidth before all categories can be considered. Block 1620 computes the initial value for available bandwidth, as the difference between the aggregate flow capacity and the sum of flow minima.

Flow values are obtained for each cost category in order of decreasing cost within blocks 1640 through 1675. Factor x is calculated next in block 1540, and tested against 1 in block 1650. Flow rates for each sessions of the category under consideration are computed in block 1660 if x is less than 1, or 1670 in the contrary case. In the former case there is no more bandwidth to allocated to the sessions in the category under consideration.

Call Acceptance Control (CAC)

CAC for Maximal Flow Overview (FIGS. 7-8)

The CAC procedure applicable to this flow optimization relies on the essential step of accepting a new client if and only if the added load induced thereby does not compromise service to existing clients or the new one. This critical step could not be accomplished without the close integration with previously-described flow-modulation methods of FIGS. 5, 6, 15 and 16.

According to the previous discussion, the minimum flow rate is the minimum sustained flow rate that guarantees that the associated viewer will not be subject to interruptions in service due to a shortfall of content from the media server. It follows that whenever data is being delivered at a rate in excess of the minimum flow rate, a downward adjustment toward the minimum level could be accommodated as needed to surrender bandwidth to any newcomer.

FIG. 7 depicts content flow over a channel for the course of a typical session, and also how data is delivered under real-time streaming D. The amount of content delivered is the same in either case, but the manner of delivery differs considerably. A session is launched at time 0 as the network is lightly loaded, and the optimizer sets an accordingly high flow rate. Another client emerges at the end of interval 700, causing a downward adjustment to the flow rate over interval B, as available bandwidth is shared between two sessions. During both of these intervals the minimum flow rate 720 drops quickly, as data accumulates in the client's media buffers. At the end of interval B, a massive influx of clients necessitates that flow be dropped to the minimum flow rate, which now lies substantially below the streaming rate D and is held until all data is delivered at the end of interval C. Note that the minimum flow rate, shown as element 720, diminishes monotonically over time.

The server swing capacity is defined as the difference between the maximum capacity of the server and the total minimum flow rates for all active clients. Therefore:

(14) swingCapacity=server.maxFlowRate-$\Sigma_{i \epsilon SactiveClients}$ (client.look-up(i).session.minFlowRate)

Given the monotonic decreasing nature of session minimum flow rates, server swing capacity can readily be seen to be a monotonic increasing function of time over the intervals separating client admissions, at which point it undergoes a drop as a new load is taken on. This all-important characteristic implies the following:

Any client admitted for service based on the present value of swing capacity is guaranteed to have sufficient bandwidth at its disposal over the entire future course of the session.

FIG. 8 depicts the server swing capacity 800 over the course of the sessions illustrated in FIG. 7. Swing capacity rises quickly over intervals A & B as data is delivered at high flow rates over the network. It holds steady over interval C when all channels flow at their minimum rate then jumps at the end of C before resuming its monotonic rise once again.

Procedure (FIG. 9)

In this procedure, which executes on a periodic basis, queued clients awaiting bandwidth are scanned in FIFO order. For each one, the required bandwidth is computed as per the client's prior content selection. If the available swing capacity (reduced by a safety margin) exceeds the amount required, then the client is activated and swing capacity is adjusted accordingly. Otherwise, two possible cases are considered: 1) under the FirstFit embodiment, the procedure continues scanning clients to the end of the queue, activating clients whose requirements can be met; 2) under the FIFO embodiment, the procedure ends with the first candidate client whose requirements cannot be met.

In step 900, available server swing capacity is evaluated according to the formula swingCapacity=server.maxFlowRate−$\Sigma_{i \in SactiveClients}$(client-.get(i).session.minimumFlowRate)

The bandwidth requirement for client id in Step 920 is obtained as follows: required_bandwidth=client.lookup(id).contentSelection.averagePlayRate The predicate evaluated in Step 940 is given by the expression:
(required_bandwidth<=swingcapacity−server.cac_flowSafetyMargin)

In step 950, client activation entails allocation of a session and a channel, and insertion in the set of active clients eligible for bandwidth allocation by the optimal flow modulator.

In step 960 the swing capacity is diminished by the amount reserved for the activated client:
swingcapacity=swingCapacity−required_bandwidth;

Responding to Variations in Network Capacity (Maximal Flow)

In the CAC procedure for maximal flow, a safety margin was introduced, namely server.cac_flowSafetyMargin, to provide the means for ensuring that the server's swing capacity will never fall below a minimal threshold value.

According to this procedure, the following inequality always holds true:

(15) swingcapacity>=server.cac_flowSafetyMargin

In the previous discussion, a server's swing capacity provided the basis for determining whether or not a prospective client should be allocated bandwidth.

By holding server.cac_flowSafetyMargin in reserve, the CAC algorithm forces delivery of content at faster than real-time rates among accepted clients, even under the heaviest load. The net effect is to apply upward pressure on client side buffer levels, thus promoting continuous accumulation of content and a jitter-free viewing experience once a session is under way.

In another embodiment, server swing capacity can also be interpreted as specifying the maximum amount by which the server.maxFlowRate constraint can be dropped without affecting service, should such an adjustment prove necessary due, for instance, to an influx of exogenous network traffic that diminishes the amount available for multi-media services. Parameter server.cac_flowSafetyMargin can thus be set so as to guarantee a minimum capacity to tighten the constraint on maximum server flow in response to unexpected load changes that affect the server's ability to service its existing clients as well as new ones.

Anticipating Scheduled Variations in Network Capacity (Maximal Flow) Overview (FIG. 10)

FIG. 10 depicts how the constraint on maximum flow might be allowed to vary according to the time of day, day of the week, and so forth, in expectation of time-varying traffic flow levels extrapolated from past experience, traffic flow models, etc. Maximum flow rate 1000 can be seen to vary based upon the time of day. In practice, defining the right-hand-side of inequality constraint 1 as a time-dependent expression can impose such time-varying capacities. According to the previous description, the optimizer, which executes on a periodic basis, will automatically seek new flow levels for every active session as the constraint varies. There is, however, no guarantee that an acceptable operating point will be found for all sessions (i.e. one that respects the minimal and maximum constraints on session channel flow). One such example is the case where the server is loaded to the limit and total capacity is curtailed in excess of the aforementioned safety margin. Should such a situation arise the only recourse may well be the termination of a number of established sessions (i.e. load shedding).

The goal is to eliminate service disruptions of this sort by allowing the CAC procedure to look ahead into the future, and accept new clients only if these can be accommodated without any compromise in service in the midst of previously anticipated changes in available network capacity. The following CAC procedure generalizes the previous one: before accepting a client, the test on swing capacity is repeated over a sequence of time segments that cover the proposed viewing period.

Definitions

Let:
(16)    t_end(i)=client.lookup(i).session.playTimeToGo+t_now

Let server.maxFlowRate(t) be server flow capacity as a function of time, as exemplified in FIG. 10.

Let $Seq_7$(t_now)=advancing sequence of future times, lead by t_now, when server.maxFlowRate(t) undergoes a step change. For instance, at 9:15 in FIG. 10 this sequence reads as follows: 9:15, 9:30, 11:30, 13:30, 6:30, 7:30.

The server swing capacity at a future time t is computed according to the capacity and worst-case client flows at time t.

(17)    swingCapacity(t)=server.maxFlowRate(t)−$\Sigma_{t\_end(i) >= t}$client.lookup(i).session.minFlowRate)

It is noteworthy that the worst-case client flows at time t are express terms of the present minimum flow rates, which cannot increase over time, but might hold steady. Finally, a predicate is defined that tests whether a prospective customer will cause swing capacity to be exceeded at some time t, as follows:
(18)    boolean client_fits(i, t){if(client.lookup(i).contentSelection.averagePlayRate<=swingCapacity(t)−server.cac_flowSafetyMargin) return true; else return false;}

Procedure (FIG. 11)

This procedure is an adaptation of the first, which has been extended to consider swing capacity at times in the future when capacity undergoes scheduled changes. Before accepting a client, its minimal bandwidth requirement (which by construction of the flow modulator will never increase over time) is checked against projected swing capacity at points in time when total available capacity undergoes scheduled step changes, provided these times fall within the proposed content viewing period. A candidate is activated only if all tests succeed.

Step 1100 builds a sequence of time values (SeqT) at which step capacity changes are scheduled to occur. The first element of this sequence is t_now, representing the present.

Beyond step 1100 the queue of waiting clients is scanned in FIFO order, yielding a candidate designated by id at each iteration.

The bandwidth requirement for client id in Step 1120 is obtained as follows:

required_bandwidth=client.lookup(id).contentSelection.averagePlayRate

The worst-case end time for content flow to id is obtained according to the content selected, as follows:

t_end=t_now+client.lookup(id).selected.playTime

Steps 1130 through 1150 are executed within an iteration for each time point t in SeqT falling between t_now and t_end. This iteration is ended in step 1130 if t exceeds the time window of interest, or in step 1150 if the supply of scheduled capacity changes is exhausted.

For each time value, step 1140 compares required bandwidth to projected swing capacity.

Projected swing capacity at time t is:

swingCapacity(t)=server.maxFlowRate(t)$-\Sigma_{t\_end(i)>t}$(client.lookup(i).session.minimumFlowRate)

Note that only active clients whose t_end times occur after t are considered in the sum of minimum flow rates.

The predicate expression used in step 1140 at time t is thus:

(required_badwidth<=swingCapacity(t)−server.cac_flowSafetyMargin)

Step 1160 performs the same actions as step 660 in the previous CAC flowchart The first CAC process is a special case of the present one, in which the set of step change times to server.maxFlowRate is empty (i.e. server.maxFlowRate is constant), and $\text{Seq}_T$(t_now)==t_now.

In preparing $\text{Seq}_T$(t_now), one need only consider future times that will pass before the longest possible content is played out if started at t_now. In order to sidestep problems associated with rollover (at midnight, year 2000, etc.), time is best expressed as a monotonically increasing value (e.g. seconds since Jan. 1, 1990).

CAC for Maximal Charges

Overview (FIG. 13)

Previously, a method for flow modulation was presented that maximizes charges to clients with active sessions. The CAC embodiment presented previously was not sufficient as it does not consider the cost of service as a basis for connection acceptance. As a result, it may turn away higher paying customers while granting service to lower paying ones, thereby defeating the purpose for this particular embodiment.

Therefore, another embodiment is defined which offers the following features:

1. Awaiting clients are serviced in order of their respective service categories, higher paying clients first.
2. Once accepted, a client is guaranteed to receive acceptable service irrespective of its service category.
3. Under heavy load conditions higher paying customers are more likely to be accepted than lower paying ones.
4. Lower paying customers will no be starved for service when higher paying ones enjoy a surplus.
5. Available bandwidth is not thrown away needlessly while clients are being denied service.

The first objective is easily met by dividing the client queue into as many bands as there are service categories, resulting in a banded queue. Bands are ordered within the queue according to their service categories, with the costliest category in front. As prospective clients arrive and make their selection they are placed in their respective queue band according to their service category (which may be set contractually, according to content selection, etc.).

Our second objective is met by employing a procedure patterned after those presented previously & offering the same guarantee. Toward our third and fourth objectives we propose dividing total available bandwidth in as many strata as there are service categories. As depicted in FIG. 12, two service categories are shown, Premium and Basic, each entailing an associated cost of service. A prospective client is accepted only if there is sufficient swing capacity available within its given service category. The swing capacity for a given category is given by the smaller of 1) the difference between its maximum floor flow rate (corresponding to the top of the stratum for the service category) and the sum of the minimum rates of all active sessions in its category or below, and 2) available swing capacity overall. Finally, our fifth objective is met by allowing the flow optimizer to function freely subject to its operational constraints. The imposed ceilings on call acceptance by category relate to minimum flow rates, which merely impose a floor on actual flow rates. For example, basic clients might well consume all available bandwidth 300 in the absence of any premium customers, yet could be throttled back toward their floor flow rates (which together cannot exceed 200 in this example) at any time should any premium customer suddenly demand service. In contrast, premium customers could consume the entire 300 bandwidth. As lower paying customers appear these would be admitted to the degree that their quota on minimum flow is not exceeded (i.e. 200) and the availability of swing capacity on the system.

Procedure (FIG. 13)

The present procedure requires a number of ancillary definitions, which follow:

Let the service categories be denoted by k=1 . . . N, where k also denotes the cost of service.

Let server.maxMinFlowRate[k−1] be the top of the stratum for service category k. Note that server.maxMinFlowRate [N−1]=server.maxFlowRate.

Let $S_k$ be the set of active client indices with a service category equal to or less than k. Note that S1 is contained in S2, S2 is contained in S3, and so forth, and that $S_N = S_{activeClients}$.

Let swingcapacity(k) denote available swing capacity for service category k. By construction:

swingCapacity(k)=minimum of: (server.maxMinFlowRate[k−1]$-\Sigma_{i \in Sk}$client.lookup(i).session.minFlowRate))

(server.maxFlowRate$-\epsilon_{i \in SactiveClients}$(client.lookup(i).session.minFlowRate)))

Referring to FIG. 13, this method is used for CAC when multiple rate tariffs are in effect, and there is a desire to maximize economic returns to the service provider while offering acceptable service to all.

All waiting clients are scanned in FIFO sequence. The actions taken in Steps 1320 and 1360 are identical to those described in connection with earlier CAC flowcharts.

Step 1340 evaluates a predicate expression that tests whether the required bandwidth can be accommodated without exceeding the lesser of 1) swing capacity available to the client's category of service, and 2) total available swing across all categories of service. The latter factor could be determinative if all available bandwidth were allocated to high paying customers, leaving lower paying ones such as the proposed client unable to draw from their unfilled quota.

Let us suppose that candidate client id belongs to rate category k.

We define the swing capacity available in rate category k as:

swingCapacity(k)=least of: (server.maxMinFlowRate[k−1]−$\Sigma_{i\ in\ Sk}$client.lookup(i).session.minimumFlowRate)) and
(server.maxFlowRate−$\Sigma_{i \in SactiveClients}$(client.lookup(i).session.minimumFlowRate))

The predicate expression invoked by step 1340 can now be written as follows:

(required_bandwidth<=swingCapacity(k)−server.cac_flowSafetyMargin)

This algorithm processes queued clients in band sequence, and within every band in FIFO order. If the predicate evaluates to true, the client is activated. Otherwise two possible cases are considered: 1) under the FirstFit embodiment, the procedure continues scanning clients to the end of the banded queue, activating clients whose requirements can be met; 2) under the FIFO embodiment, the procedure ends with the first candidate client whose requirements cannot be met. Many other variations on these two embodiments might also be considered.

Anticipating Scheduled Variations in Network Capacity (Maximal Charge)

Overview

The procedure applicable to optimization of delivery charges is obtained by blending elements of the CAC method depicted in FIG. 13 into the method depicted in FIG. 11, which applies without change. To understand how this might work it may be useful to visualize a version of FIG. 10 stratified along its length in the manner of FIG. 8. As the maximum flow level undergoes a step change, so too do the widths of its constituent strata in equal proportion.

Procedure

As previously mentioned, the CAC method (FIG. 11) applies to this circumstance also, provided we alter the definition of two routines, (17) and (18), upon which that procedure relies, yielding (20) and (21), and adopt the banded queue organization outlined in the previous section.

The server swing capacity at a future time t is computed according to the capacity and worst-case client flows at time t.

(20) swingcapacity(k, t)=minimum of ((server.maxFlowRate(t)*(server.maxMinFlowRate[k−1]/server.maxMinFlowRate[N−1]) $\Sigma_{i\ e\ Sk\ \&(t\_end(i)>t)}$(client.lookup(i).session.minFlowRate)), (server.maxFlowRate−$\Sigma_{i \in SactiveClients\ \&(t\_end(i)>t)}$(client.lookup(i).session.minFlowRate)))

Finally, we define a predicate that tests whether a prospective customer will cause swing capacity to be exceeded at some time t, as follows:

(21) boolean client_fits(i,t) {
  k=client.lookup(i).costOfService;
  if(client.lookup(i)
    .contentSelection.averagePlayRate<=swingCapacity(k,t)−server.cac_flowSafetyMargin) return true;
  else return false;
}

System Description

Referring to FIG. 14, a block diagram illustrating a preferred embodiment for a system implementing the methods presented herein is shown. Block 1485 depicts plurality of network-based client computers that receive data from a server over the course of a session. Every client sessions has an associated session block 1435 within the server by means of which a flow rate of content from client to server is effected and regulated to a given flow rate set-point. The flow optimizer 1430 manages bandwidth utilization across all sessions that have been admitted by the system call admission control (CAC) and the bandwidth call admission control blocks, labeled 1400 and 1420 respectively. Specifically, the flow optimizer 1430 modulates the flow rate set-point of every active session so as to optimize aggregate flow or, more generally, cost.

Call Admission Control

Whenever a client contacts a server requesting service, the server must determine whether or not to admit the client. This admission function is performed in two separate phases. The system call admission control block 1400 considers whether or not sufficient internal resources exist to support the request. Toward this end, the system CAC 1400 estimates the needs of the prospective client with respect to a set of limited system resources such as I/O bandwidth, cache memory, open files, threads, etc. A request is denied if any required resource cannot be obtained. In the contrary case, the request is passed on to the Bandwidth CAC, which tests if the client fits and admits or rejects the client accordingly. The swing capacity is computed by the flow optimizer 1430 on a periodic basis according to equations (14) and (17) as appropriate. The managed bandwidth must reflect the true capacity of the attached network and the adapters leading thereto. This parameter should not be set arbitrarily high to prevent rejection of client requests. Doing so will cause the system to admit calls that cannot be properly handled, thereby diminishing the quality of the viewing experience.

Having admitted a client, block 1430 creates a client session block 1435, which then begins to converse with its client-resident counterpart, 1480) during their launch phase. Thereafter, the flow optimizer 1430 assumes control, and modulates flow over the session until either all content is delivered, or a failure to deliver is detected, or one of a number of VCR-like stream control events intervene (e.g. pause, rewind, fast-forward).

Server and Client Session Control Blocks

Data Transport Channel 1450 is responsible for transporting data packets originating from the flow regulator 1440 within the server to the former's peer entity 1460 within the client. The mode of communication between the peer entities may be connection-oriented (e.g. TCP, which delivers a byte stream in order, without duplication or loss) or datagram-oriented (e.g. UDP). Best-efforts datagram service is typically enhanced with acknowledgements to facilitate rapid recovery from occasional packet loss, out-of-sequence delivery, and duplication.

Peered session control channels 1445 and 1465 permit configuration and status data, together with miscellaneous commands, to be sent from client to server and vice-versa. A reliable connection-oriented transport service is typically employed for this purpose (e.g. TCP). Data and commands alike are multiplexed over this channel in the service of other entities within the clients or server. Thus, a datagram-oriented data transport channel 1460 within a client 1485 might employ the session control channel to ferry selective acknowledgements to its peer in the server. Similarly, the flow meter 1465 within the client 1485 forwards the measured flow rate to the associated flow regulator 1440 within the server.

The flow regulator 1440 obtains content data from a cache or disk, at the current offset into the content file, which it forwards as packets to the data transfer channel 1450. The size and/or pacing of the packets are determined by the flow regulator 1440 in order to achieve the flow rate set-point imposed by the flow optimizer 1430. The flow regulator 1440 is also responsible for determining the channel flow capacity to the client, which is the least of a configured value obtained from the client and a measured value. Toward this end, during the launch phase, the flow regulator 1440 might send content data packets to the client flow meter 1475 in a series of packet trains at progressively higher peak flow rates ending with the configured maximum flow rate, if any. The highest measured flow rate reported by the client flow meter 1475 is accepted as the flow rate capacity, which is posted for use by the flow optimizer 1430. Subsequently, the flow regulator 1440 will compare the flow rate set-point with the flow rates reported by the flow meter 1465, and down grade capacity as needed should the measured flow rate fall consistently fall below the requested flow rate. Whenever such a downgrading occurs, the flow regulator 1440 will test for subsequent relaxation of a transient constriction by means of the aforementioned series of packet trains in which the peak packet flow rate exceeds the delivered flow rate.

The buffer manager 1470 accepts data from the flow meter 1465, which data is retained until it is consumed or passed over the content consumer 1480. The buffer will typically be implemented as a ring buffer in memory or on disk. The write cursor will lag the read cursor by a no less than a specifiable time interval so as to permit rewinds of acceptable scope without requiring selective data re-retrieval from the server.

Flow Optimizer 1430

The flow optimizer 1430 assumes control over a session once it has been launched, and its channel capacity has been determined. Subsequently, it modulates the flow rate set-point of every session such as to optimize aggregate flow or charges across all active sessions, subject to a variety of min/max constraints on sessions flows, and a maximum constraint on aggregate session flow, as previously discussed.

The flow optimizer 1430 continues to modulate session flow until all content has been delivered, or one of a number of session anomalies intervene, as follows:

A downgraded session flow capacity drops below the minimum session flow rate. The session is dropped by the optimizer 1430 as a solution involving this channel does not exist. The user is forced to apply for re-admission, with the option of accepting slower than real-time delivery at the present encoding rate, or accepting a degraded viewing experience at a reduced encoding rate better adapted to the presently available bandwidth.

A pause VCR command is received from the client. Flow to the client can continue until the client-side buffer is topped off, after which time flow drops to zero. The session is permanently dropped should the pause persists too long. Until that time, the CAC safety margin is temporarily increased by the jit (Just-In-Time) flow rate of the paused session. In this way the session can be resumed without the need for re-admission and the jit bandwidth is made available to currently sessions so long as the pause persists.

A VCR Jump-Forward command is received from the client. This action is problematic as it causes the just-in-time flow rate (calculated at the new forward offset) to increase, in violation of the assumptions of the CAC algorithm. It must be noted that this violation will occur even if the content that is sought has already been delivered to the client-side buffer. One workable policy is to force the client to apply for re-admission at the forward offset and with a suitably modified buffer level.

A VCR Jump-Backward (Rewind) command is received. This action may entail the need for re-transmission of content, as previously discussed. The just-in-time flow rate will decrease as per the new position and adjusted buffer contents.

Tunable Minimum Constraint

A parameterized family of minimum flow constraints can be defined as follows:

(22) wherein:

$f_k(t)$=Target content flow rate for session k;
$f_k^{JIT}(t)$=Just-in-time flow rate for session k;
(RHS of Equation (5))
$\beta$=Burst tuning factor (positive or zero); and
$f_k^{min}(t)$=Minimum (reserved) flow rate for session k.

This family converges on $f_k(t) >= f_k^{JIT}(t)$ when $\beta$ approaches 0. A $\beta$ value of 0.1, for example, ensures a minimum flow rate that exceeds the JIT flow rate by 10%. Thus, non-zero values of $\beta$ force early delivery of content to a player's media buffer, with beneficial effects on the viewing experience.

Alternative Call Admission Control

The traditional CAC algorithm compares the flow rate requirement of a prospective client with the unused bandwidth (obtained by subtracting the aggregate flow target from the server flow capacity) and grants service if unused bandwidth is not exceeded. This procedure may break down as the optimizer causes all available bandwidth to be used if it can, thereby reducing unused bandwidth to zero in the best case, even when a new client could be accommodated with a healthy margin to spare.

Nevertheless, a simple variation on this idea can be used. Available bandwidths can be defined as the difference between server flow capacity and the sum of minimum flow rates for each session computed according to (22) as follows:

$$f_{available} = f_{Svr}^{max} - (f_1^{min} + \ldots + f_n^{min}) \quad (23)$$

wherein: $f_{available}$=Available bandwidth
$f_{Svr}^{max}$=Server aggregate flow capacity; and
$f_n^{min}$=Minimum (reserved) flow rate for session n.

Service is granted if the computed minimum flow rate of the prospective client is less than available bandwidth even when unused bandwidth is zero.

Toward a Tunable QOS

In the preceding discussion it is assumed that all clients share the same value of .beta. One might also consider a scheme whereby a client receives a $\beta$ value according to the class/cost of service that client has signed up for: the greater the cost (and expected quality of service, or QOS) the greater the value of $\beta$.

Instead of maximizing charges by the methods described above, a variation on the algorithm to maximize flow is considered whereby the reserve flow computation for every session takes into account the individual $\beta$ value of the associated client. In this fashion a single algorithm can serve either end. The optimizer first ensures that every session receives its required minimum bandwidth (which would now typically depend on $\beta$ and elapsed session time) before allocating any excess bandwidth more or less evenly to all by interpolation. (According to FIG. 15.)

The scheme is simpler computationally than the iterative interpolation method shown in FIG. 16; it is also arguably more fair and stable with respect tot he allocation of available bandwidth.

Deadline-Driven Content Distribution

In delivering viewable or audible content to a player, the optimization algorithm imposes a minimum flow rate that ensures that all content is delivered by the implied deadline, which is the last moment of a play session. Notwithstanding, the optimizer attempts to deliver content earlier according to bandwidth availability within the server taken as a whole. A similar, though far simpler scenario arises relative to the distribution of content from an optimized server to a target device, whenever the delivery must be accomplished by a designated time, or equivalently, within a given elapsed time, and when overlapped non-blocking consumption of the content at a fixed rate is not required.

One example concerns the application where a session bundle comprises a session associated with the featured program together with sessions for every advertisement scheduled to interrupt the feature program at a designated time. Each session is endowed with a separate media buffer, which, in the case of ads, would typically be large enough to accommodate the ad in full, thereby permitting a seamless transition to the ad at the appointed time.

In adapting the optimizer to the needs of content distribution we must revisit the formulation of the flow constraints, as follows:

1. Media buffers are not of a concern, let alone buffer overflow, and it can be assumed that all content received is saved away in a file on disk, or in memory awaiting further use.
2. For these same reasons, the value of β may be zero, at which the minimum flow rate equals the just-in-time rate obtained by dividing the content as yet undelivered by the time till deadline:

$$f_k^{JIT}(t_k) = L_k^{TOGO}/(T_k - t_k) \quad (24)$$

wherein: $L_k^{TOGO}$=Content to go for session k, i.e., as yet undelivered by the server at time t, (client.lookup(k) .session.payloadToGo).

Given the arbitrary format of the file to be distributed, T no longer signifies the "duration of play" at the average play rate (averagePlayRate); rather, T represents the elapsed time to the deadline measured at the moment the delivery session was launched, and t represents the elapsed time since session launch.

Session Bundles

A session bundle is a set of sessions that flow along a shared channel, and are thus subject to an aggregate flow constraint equal to the capacity of the shared channel. One important application of session bundles is connected with ad insertion.

It is not enough to treat each of the constituent sessions as independent with respect to the flow optimizer, for this practice might well result in session flow targets that do not exceed channel capacity when considered singly, yet exceed this same shared capacity when summed together.

A solution to this problem involves two distinct steps:

1. The sessions bundle is treated as a virtual session by the server optimizer, subject to the minimum flow constraint obtained by summation of the individual session minima, and a maximum constraint that is the least of (a) the sum of the least of constraints (3) and (4) for each session, and (b) the shared channel capacity client.lookup(k).channel.maxFlowRate ($f_k^{cap}$). The flow optimizer then generates an aggregate flow target for all channels virtual sessions by interpolation, using:

$$\text{Cost}(t) = f_1(t) + \ldots + f_n(t) \quad (25)$$

The cost vector in this instance is the n-dimensional unit vector, where n is the number of active clients.

$$c = 1, 1, \ldots, 1) \quad (26)$$

Now it is possible to have an achievable aggregate flow target for the session bundle k that we must apportion optimally among the constituent sessions. Fortunately for us, our interpolation procedure of FIG. 15 can be applied again to the sessions in our bundle, but where the aggregate flow target generated above replaces the aggregate flow constraint $f_{Svr}^{max}$ Specifically:

For every flow $f_{ki}$, within session bundle k, the optimal flow rate is obtained by interpolation between minimum and maximum session flows:

$$f_{ki}^{opt} = f_{ki}^{min} + \alpha^*(f_{ki}^{max} - f_{ki}^{min}) \quad (27)$$

$$\alpha = [(f_K^{bundle} - f_{k1}^{min} + \ldots f_{kn}^{min})]/[(f_{k1}^{max} - f_{k2}^{min}) + + (F_{kn}^{max} - f_{kn}^{min})] \quad (28)$$

and the value of $f_k^{bundle}$ is obtained from a higher level optimization in which session bundle k is treated as a virtual session for which:

$$f_k^{min} = f_{k1}^{min} + \ldots + f_{kn}^{min} \quad (29)$$

$$f_k^{max} = \min(f_{k1}^{max} + \ldots + f_{kn}^{max}, f_k^{cap}) \quad (30)$$

It must be noted that session bundles are typically dynamic in nature, outliving many if not all of their constituent sessions. Before a session is added to the bundle two CAC decisions must be reached:

(1) establish bandwidth availability within the bundle; and
(2) bandwidth availability within the server.

Relationship to Adaptive Rate Control

The flow optimization methods should be viewed as constituting the lowest and perhaps only the first of many supervisory control layers to sit astride all streaming sessions, which comprise their own hierarchical stack of control functions; rate adaptive control sitting above a flow rate regulator which relies on a transport entity.

Channel capacity is known to vary widely over time. A capacity drop to below the minimum reserve flow rate is problematic as it causes the latter to rise in violation of its monotonicity assumption. In a server with available bandwidth to spare such a rise can be accommodated by the flow optimizer (by bumping the session's minimum flow reservation to the higher value) provided the flow deficit can be made up in the near term by draining pre-delivered content from the media buffer. Should either of these resources approach depletion, stream degradation to a lesser bit-rate or frame rate may be the only viable option short of a pause. Whether up or down, any rate change is a change to fe, which must be preceded by change to session's reserve flow rate allocation by the optimizer.

As can be seen, the optimizer and rate adapter must be integrated with care. One possible approach would be to modify a rate adapter such that it renegotiates its proposed fe value with the flow optimizer prior to effecting the rate change it deems appropriate based on information provided by the flow regulator. Rate increases might well be subject to deferral under heavy load conditions, awaiting bandwidth availability. The opposite is true of rate flow decreases: these would be forestalled as long as possible by the optimizer on a system that is not fully loaded, as previously discussed.

Live Events

Referring to FIG. 17, the method of the present application can be extended to the optimization of "live", time-shifted "near-live" events, and cascaded delivery, wherein one server delivers content to another while the latter accepts clients for the same content. The extension assumes the following characteristics of the server and the live performance:

1. The performance is of a fixed duration T known in advance, encoded at an average rate fe, with a projected content payload of fe*T;
2. The origin server at the point of injection delays the stream by a small dwell time $T^{DWELL}$ on the order of seconds (e.g. 10). Notwithstanding, the delayed content is available for early delivery to mirrored servers and players with the aim of providing these with a modicum of isolation from network jitter affecting the timely delivery of the live video frames.
3. Throughout the live event, captured content is stored in a file, thereby permitting late joiners to view the "live event" starting from any point between the present and the event start time;
4. At the conclusion of the live event, the encoded content, now fully captured to a file, is available for viewing over the balance of the admission window (e.g., 60 minutes in FIG. 17).

The optimization of live events and video on demand (VOD) differ principally in one respect, namely in the formulation of the server content underflow constraint.

For VOD, this constraint is

(31) $L_k^{TOGO}(t)$ is initialized to the content size (fe*T) at that start of play, and decremented as content is delivered to the client. $\Delta t$ is the time interval between successive periodic optimizations (e.g. 1 second). In practice this constraint rides well above other operative maximum flow constraints (e.g. buffer overflow, channel capacity) until the very last calculation of the session flow target by the optimizer.

For a live stream, this constraint must additionally reflect the fact that content is streaming into the server (where it builds up), even as the server streams it out toward clients, and that the latter activity cannot possibly overtake the former.

Referring to FIG. 17, (which illustrates how optimized live streams behave) line L1 depicts the build-up of freshly captured content to the server. Line L2, which is delayed (time-shifted) relative to L1 by the dwell time $T^{DWELL}$, represents the live performance as cast and viewable by clients. One such client is admitted at time A and joins the live session at the live moment B. The dashed curved line linking points B and C shows a plausible build-up of content in the client's media buffer in advance of play, as the viewer continues its advance along line L2. Past point C the top of the media buffer tracks the live capture stream and thenceforth advances along line L1. In this instance, the time shift between the live performance as cast (L2) and the live performance as captured (L1) imposes a maximum on the amount of content that could ever accumulate in a client media buffer, irrespective of its actual capacity.

Another client, admitted at time t=10, is interested in viewing the live stream from the beginning without missing anything. As before, the dashed line joining 10 and D depicts a plausible build-up of content in the client's media buffer in advance of play, as the viewer continues its advance along line L3, which is time-shifted by (10+$T^{DWELL}$) minutes relative to L1. The greater time shift (now between L1 and L3) permits more extensive pre-buffering of "near live" content.

The present constraints do not impose suitable flow limits at and beyond points C and D when the client delivery streams finally links up with the live capture stream, in the live moment. Consequently the optimizer may propose flow targets that cannot be realized.

Accordingly, the following modification for use in connection with live or cascaded streams is made:

$$f_k(t) \leq [L_k^{TOGO}(t) - \text{Live}^{TOGO}(t)]/\Delta t \quad (32)$$

for a live event delivered at flow rate fe, we have $$\text{Live}^{TOGO}(t) = \max(fe*(T-T^{DWELL}-t), 0) \quad (33)$$

$\text{Live}^{TOGO}(t)$ is the span between projected content size fe*T (level line L0 in FIG. 17) and the content capture level line L1, whereas $L_k^{TOGO}(t)$ is the gap between L0 (i.e., fe*T) and the dashed curved line representing the content level delivered to the media buffer. The latter must always exceed the former. As the two approach one another this constraint takes effect, causing $L_k^{TOGO}(t)$ to always exceed $\text{Live}^{TOGO}(t)$ as it decreases at rate fe.

Viewers joining late and willing to see the live performance with some delay relative to the live case enjoy higher potential levels of isolation from network disturbances, and thus QOS, by virtue of their greater effective buffer capacity. By the same token, such viewers afford the optimizer greater latitude to optimize the flow of VOD and "live" content across load fluctuations, thereby enhancing server capacity. Viewers that wish to experience the live event in "real-time" nevertheless benefit by a modestly enhanced QOS conferred by a dwell time's worth of content in their buffers.

SUMMARY

A method and system for call/connection acceptance and flow modulation for network delivery of video/audio programming is thus provided. Although several embodiments have been illustrated and described, it will be apparent to those skilled in the art that various changes and modifications may be made without departing from the spirit of the invention or the scope of the claims.

What is claimed is:

1. A system for allocating bandwidth between a server device and at least one client device, the system comprising:
   a server device operative to store and deliver content having a fixed duration;
   a call acceptance module operative to receive an incoming request for service;
   a flow regulator configured to deliver content at a modulated target flow rate, the content being delivered between the server device and a respective client device when a call is accepted by the call acceptance module; and
   a flow optimizer configured to modulate the target flow rate of the flow regulator in order to optimize an aggregate flow of content:
   describing a control variable which represents a target flow rate of content from the server device to each client device, the target flow rate equal to or greater than a minimum flow rate, wherein the minimum flow rate is a non-increasing function of time obtained by dividing the content not yet delivered by remaining playtime, which ensures that all required content will be available to each client when needed;

determining time-varying constraints on the target flow rate of the content;

determining a cost function of the control variables for all clients, wherein the cost function represents an aggregate flow rate and is a sum of all flow rates for all clients;

prescribing bandwidth to all clients based upon a value of the control variables that maximize the cost function comprising performing periodic computations to update the value of the control variable such that the bandwidth can be continuously allocated to each client; and wherein a new client is accepted by:
  determining an admission capacity of the bandwidth;
  admitting a prospective client if the clients minimum allowed value of the control variable is less than the admission capacity; and
  wherein a client admitted for service is guaranteed to have sufficient content flow over the entire session.

2. The system of claim 1, wherein the flow optimizer is configured to modulate the flow rate of the flow regulator in order to optimize charges for the content.

3. The system of claim 2, wherein the flow regulator is configured to deliver the modulated flow rate of content in response to a control variable.

4. The system of claim 1, wherein the flow optimizer is configured to determine a control variable which corresponds to an optimized flow rate.

5. The system of claim 4, wherein the flow optimizer is configured to generate a cost function of the control variable that corresponds to a maximized value of the control variable.

6. The system of claim 1, wherein the flow regulator is configured to deliver the modulated flow rate of content in response to the control variable.

7. The system of claim 6, wherein the flow optimizer is configured to determine a maximized value of the control variable by:
  determining a maximum flow rate and the minimum flow rate for each client;
  determining a range between the maximum and minimum flow rates in order to find a flow rate range;
  determining unused bandwidth by finding the difference between an aggregate flow capacity and a sum of the minimum flow rates;
  determining a flow variable by dividing the unused bandwidth by the flow rate range;
  prescribing the control variable to be the minimum flow rate added to the flow rate range if the flow variable is less than one or prescribing the control variable to be the minimum flow rate added to the flow rate range corrected by the flow variable if the flow favorable is greater than one such that the control variable is easily calculated for each client.

8. The system of claim 7, wherein the call acceptance module is configured to accept a call based upon an initial value of the control variable.

9. The system of claim 1, wherein the system apportions a given total flow rate among a plurality of sessions for clients by:
  computing a sum of minimum flow rate constraints for each session;
  computing a sum of flow rate ranges for all active clients;
  computing a difference between the given total flow rate and a sum of the flow rate minima;
  computing a factor as the ratio of the difference over the sum of the flow rate ranges;
  if the factor exceeds 1, setting the flow rate to the maximum flow rate; and
  if the factor is less than 1, computing the flow rate by multiplying the client range by the factor and then adding the result to the minimum flow rate.

10. The system of claim 9, wherein the clients are distinguished by their cost of service and bandwidth is apportioned to clients iteratively, the amount apportioned to each client in a cost category is the amount remaining from prior allocations to clients in higher cost categories.

11. The system of claim 1, wherein the system is a video-on-demand system.

12. A system for allocating bandwidth between a server device and at least one client device, the system comprising:
  a server device operative to store and deliver content having a fixed duration
  a call acceptance module operative to receive an incoming request for service;
  a flow regulator configured to deliver content at a target flow rate, the content being delivered between the server device and a respective client device when a call is accepted by the call acceptance module, and
  a bandwidth manager that controls the delivery of content by performing the following steps:
    describing a control variable which represents the target flow rate of content from the server device to each client device, the target flow rate equal to or greater than a minimum allowed flow rate, wherein the minimum allowed flow rate is a non-increasing function of time obtained by dividing the content not yet delivered by remaining playtime, which ensures that all required content will be available to each client when needed;
    determining time-varying constraints on the target flow rate of the content;
    prescribing bandwidth to all clients based upon a value of the control variables that satisfies the minimum allowed flow rate and a maximum allowed flow rate, and wherein the minimum and maximum allowed flow rates exploit the available server capacity to force early delivery of content to client buffers; and
    wherein a new client is accepted by:
      determining an admission capacity of the bandwidth;
      admitting a prospective client if the clients minimum allowed value of the control variable is less than the admission capacity; and
      wherein a client admitted for service is guaranteed to have sufficient content flow over an entire session.

13. The system of claim 12, wherein a target flow rate commitment to a new client results in a reduced flow rate to existing clients.

14. The system of claim 12, wherein a cessation of flow rate to a client results in an increased flow rate to remaining clients.

15. The system of claim 12, wherein a reduction in a flow rate commitment to an ongoing client session causes increased flow rate to other clients.

16. The system of claim 12, further comprising a flow envelope, which is shaped to favor higher paying customers by committing additional bandwidth to the higher paying customers if additional bandwidth is available.

17. The system of claim 16, wherein lower paying customers are afforded additional bandwidth at a reduced flow rate as compared to the higher paying customers.

18. The system of claim 12, wherein the minimum allowed flow constraint is set higher according to the quality of service for higher paying customers.

19. The system of claim 12, further comprising a flow optimizer, the flow optimizer configured to modulate the target flow rate of the flow regulator in order to optimize an aggregate flow of content to ensure that all required content will be available to each client when needed.

20. The system of claim 12, wherein the flow regulator is configured to deliver the targeted flow rate of content in response to the control variable, which varies over time.

21. The system of claim 12, wherein the call acceptance module is configured to accept a call based upon an initial value of the control variable.

22. The system of claim 12, wherein the clients are distinguished by their cost of service and bandwidth is apportioned to clients iteratively, the amount apportioned to each client in a cost category is the amount remaining from prior allocations to clients in higher cost categories.

23. The system of claim 12, wherein the system apportions a given total flow rate among a plurality of sessions for clients by:

computing a sum of minimum allowable flow rate constraints for each session;

computing a sum of flow rate ranges for all active clients;

computing a difference between the given total flow rate and a sum of the flow rate minima;

computing a factor as the ratio of the difference over the sum of the flow rate ranges;

if the factor exceeds 1, setting the flow rate to the maximum allowed client flow rate; and if the factor is less than 1, computing the flow rate by multiplying the client range by the factor and then adding the result to the minimum allowed client flow rate.

24. The system of claim 12, wherein the target client flow rate is constrained from below or to a non-decreasing function of time that starts at some multiple of the average consumption rate, which multiple equals or exceeds one.

25. The system of claim 24, wherein the constraint on target client flow rate may increase within the bounds of admission capacity.

26. The system of claim 12, wherein the system is a video-on-demand system.

* * * * *